United States Patent [19]

Griffin

[11] 4,133,404
[45] Jan. 9, 1979

[54] AUTOMATIC LAWN MOWER

[75] Inventor: Hugh A. Griffin, Greenfield, Ind.

[73] Assignee: Agile Systems, Inc., Greenfield, Ind.

[21] Appl. No.: 717,870

[22] Filed: Aug. 25, 1976

Related U.S. Application Data

[63] Continuation-in-part of Ser. No. 571,587, Apr. 25, 1975, abandoned.

[51] Int. Cl.² .............................................. B62D 5/04
[52] U.S. Cl. ................................... 180/79.1; 56/10.2; 180/98; 250/202
[58] Field of Search ............................... 56/10.2, 1, 4; 180/79.1, 98, 79, 131; 250/202

[56] References Cited

U.S. PATENT DOCUMENTS

| | | | |
|---|---|---|---|
| 2,074,251 | 3/1937 | Braun | 180/79.1 |
| 2,751,030 | 6/1956 | Null | 180/79.1 |
| 3,152,317 | 10/1964 | Mayer | 180/98 X |
| 3,881,568 | 5/1975 | Ando | 180/79.1 X |
| 3,924,389 | 12/1975 | Kita | 56/10.2 |
| 3,972,381 | 8/1976 | Gail | 180/79.1 |

FOREIGN PATENT DOCUMENTS 2459358 6/1975 Fed. Rep. of Germany ............. 180/98

*Primary Examiner*—John A. Pekar
*Attorney, Agent, or Firm*—Woodard, Weikart, Emhardt & Naughton

[57] ABSTRACT

An automatic lawn mower operable to cut about the periphery of a lawn, moving inwardly, and automatically shutting off at the conclusion of the cutting operation. A cut border is placed about the periphery of the lawn to be mowed and also about any obstacles within the area. The mower utilizes an array of light sensitive resistors and a columnized light source to detect the transition between cut and uncut grass in order to track in an irregularly shaped spiral to the center of the lawn. A portion of the sensor system provides for proper guidance of the mower around the cut perimeter of any obstacles in the cutting area. The mower may utilize an array of light sensitive resistors, a columnized light source and actuated light reflectors to detect the transition between cut and uncut grass in order to track in an irregularly shaped spiral to the center of the lawn.

30 Claims, 40 Drawing Figures

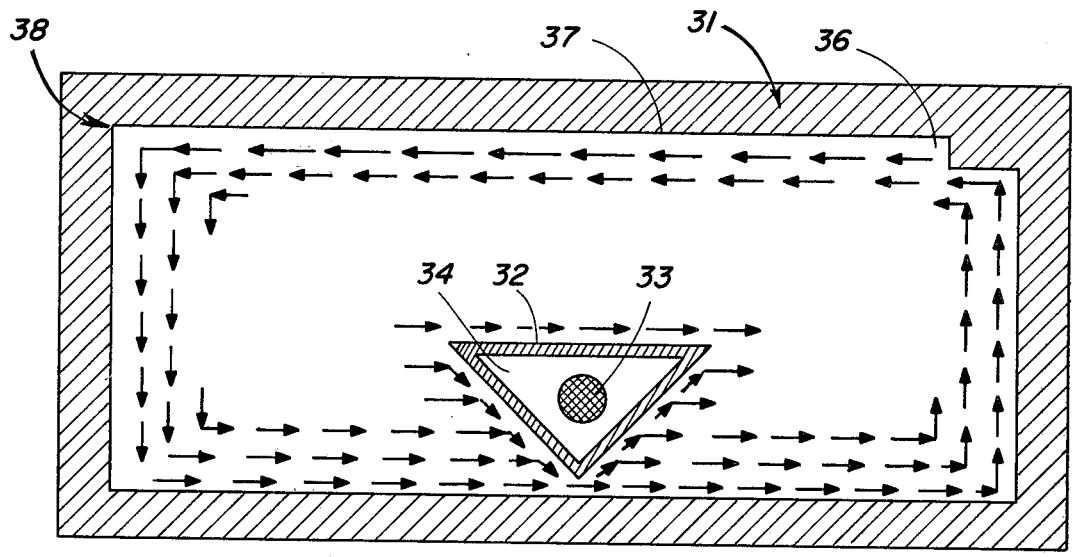
Fig. 5
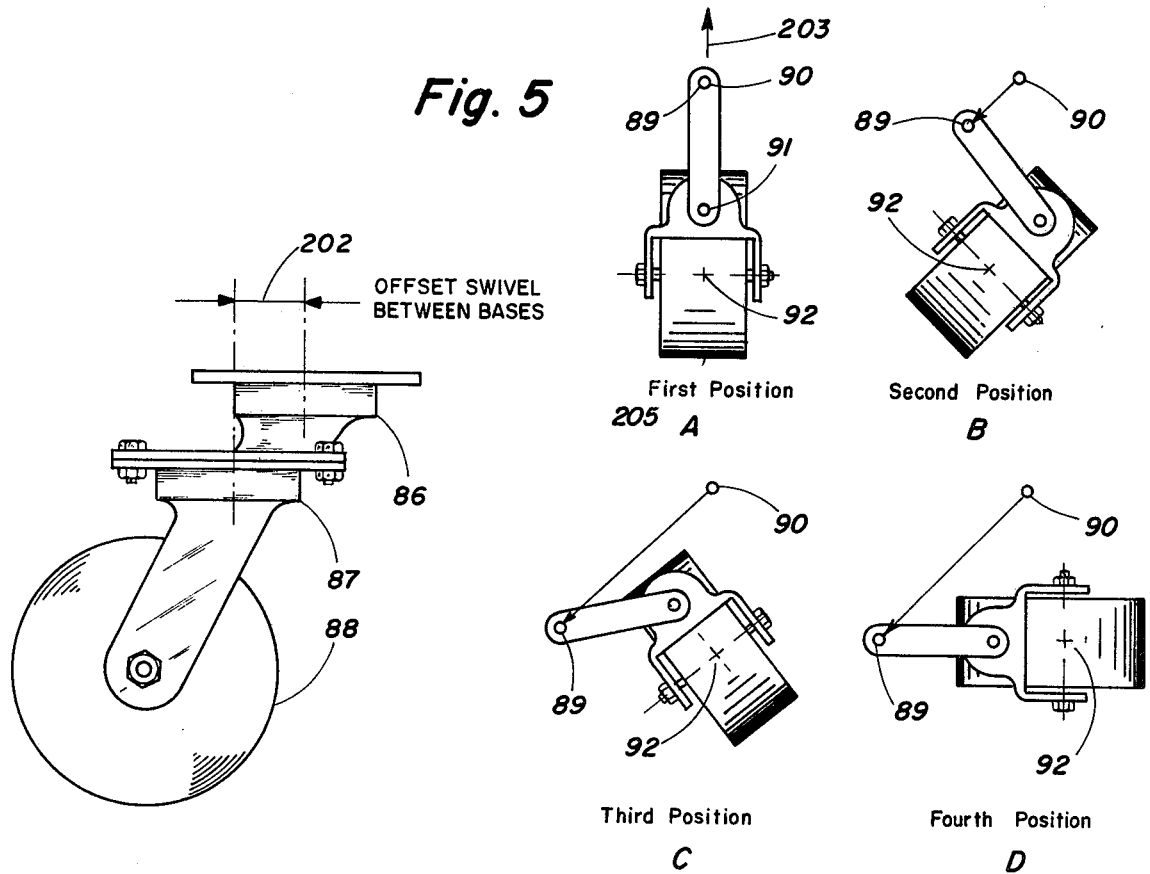
Fig. 9
Fig. 10

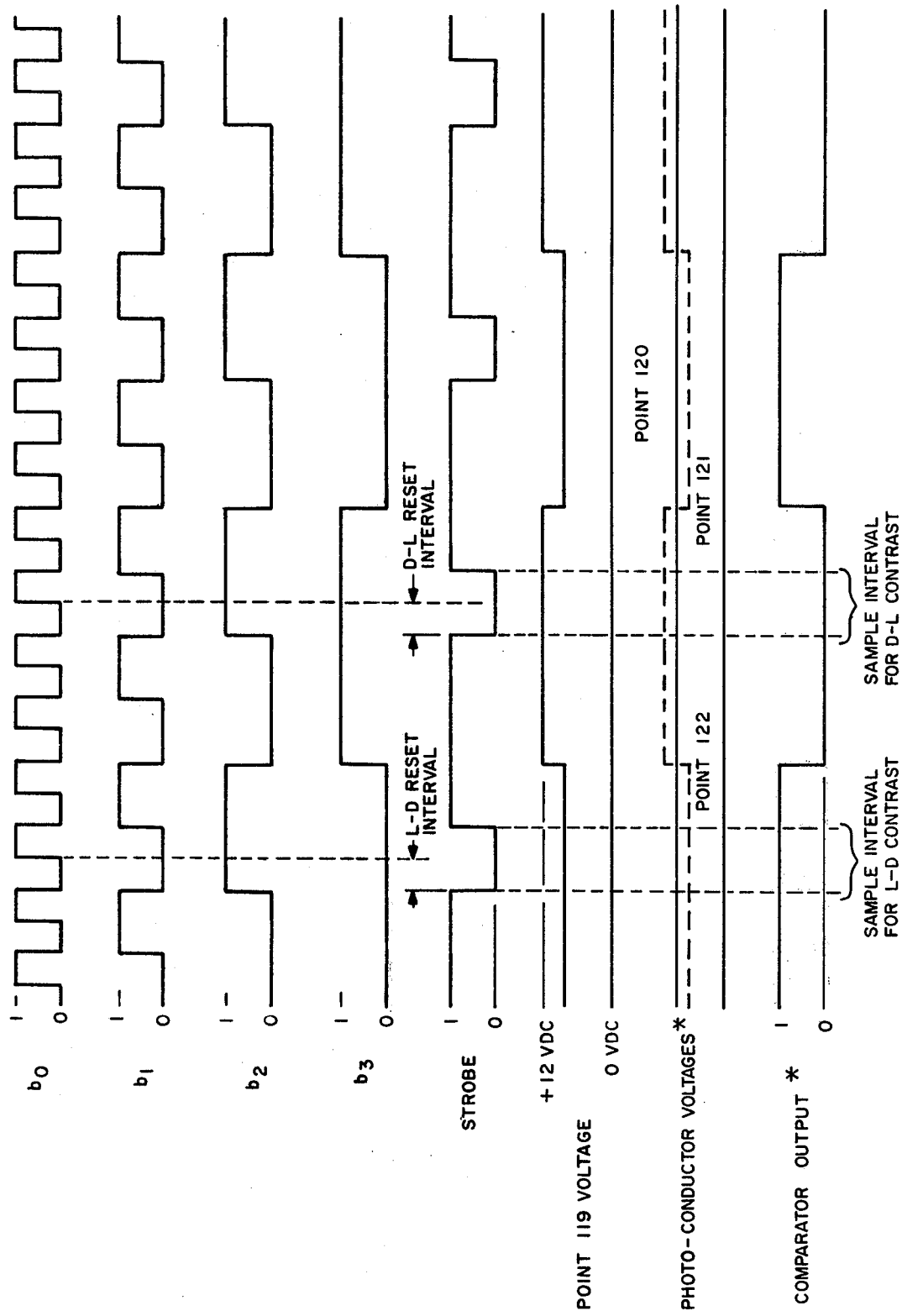

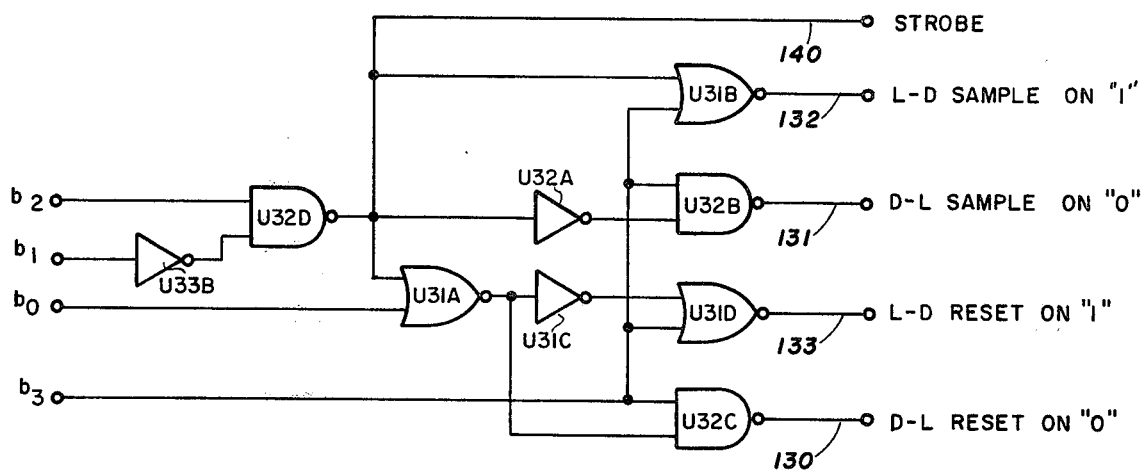

Fig. 15

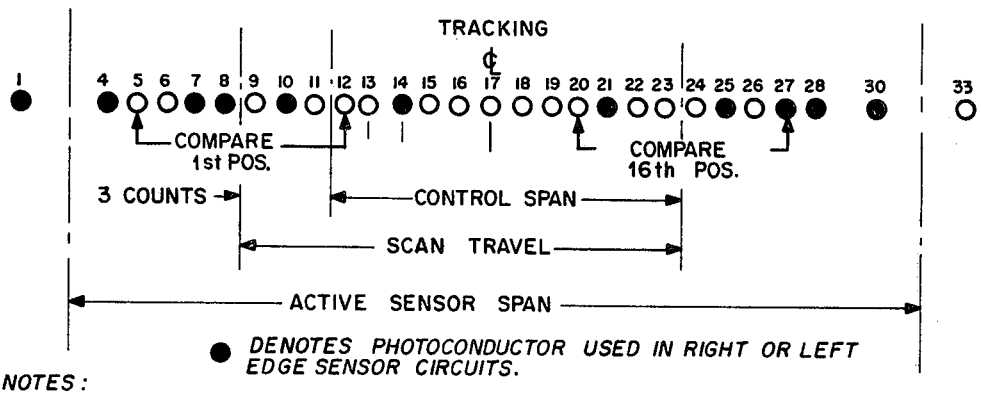

● DENOTES PHOTOCONDUCTOR USED IN RIGHT OR LEFT EDGE SENSOR CIRCUITS.

NOTES:

1 - ODD POSITIONS FROM 5 TO 27 ARE EACH CONNECTED IN SERIES WITH A RESISTOR ACROSS A 12 VDC SOURCE;
EVEN POSITIONS ARE EACH CONNECTED IN SERIES WITH A RESISTOR TO THE PULSED VOLTAGE LEVEL SOURCE (SEE POINT 119 OF FIG. 12)

2 - POSITIONS 1 AND 4 ARE WIRED THE SAME AS THE ODD POSITIONS OF NOTE 1

3 - POSITIONS 28, 30 AND 33 ARE WIRED THE SAME AS THE EVEN POSITIONS OF NOTE 1

Fig. 16

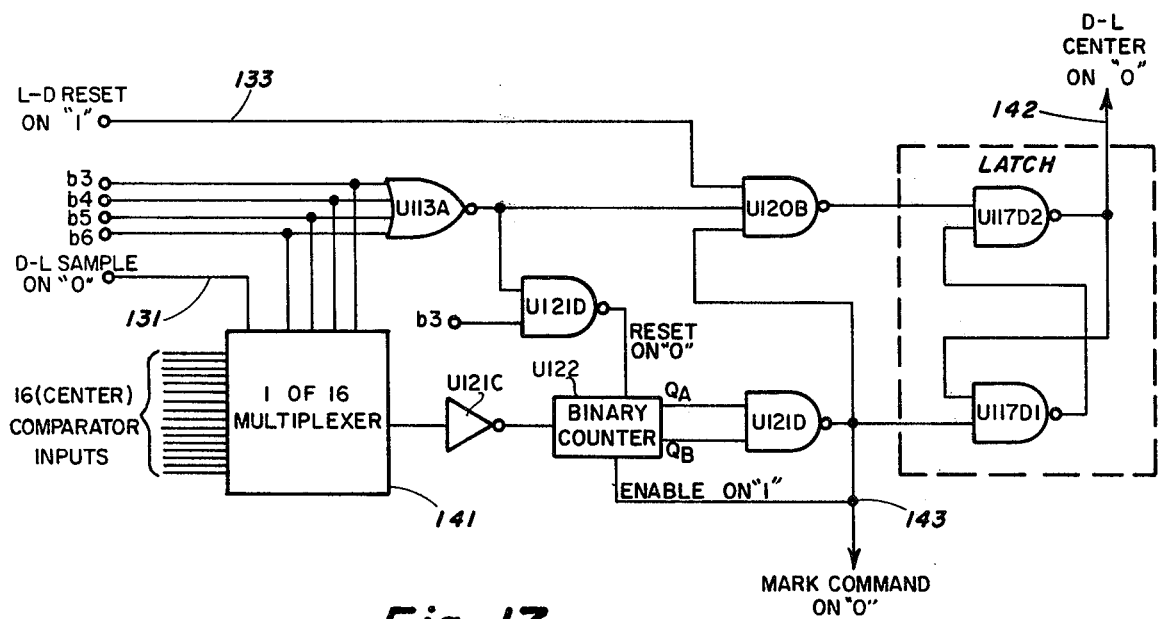
Fig. 17
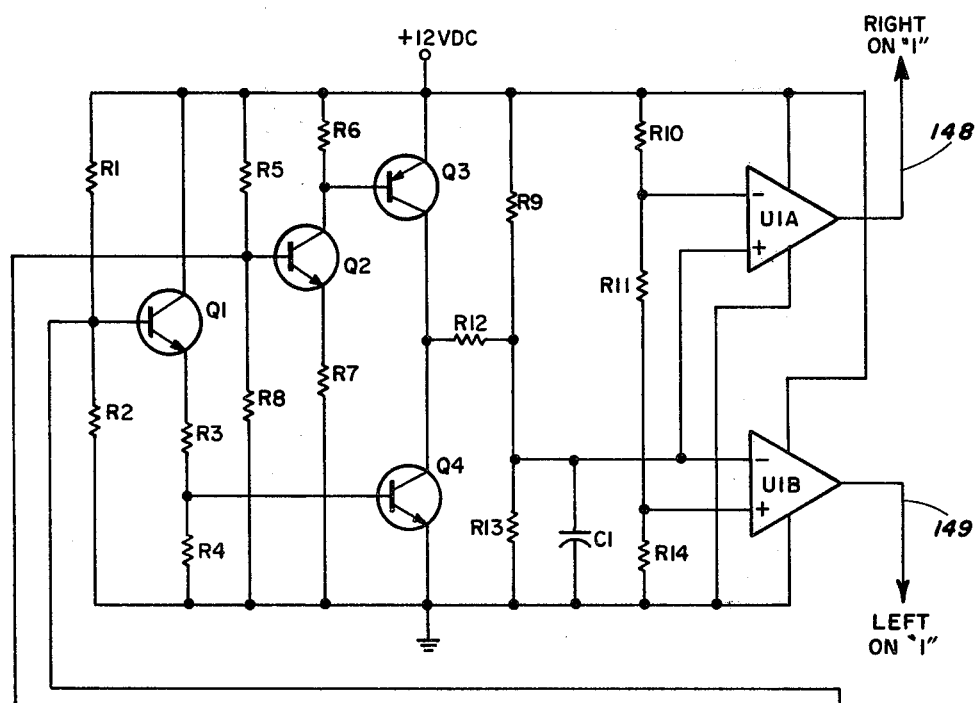
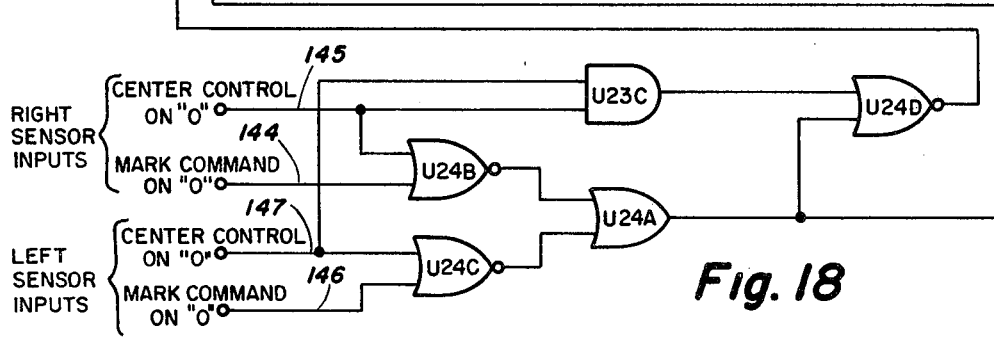
Fig. 18

DIRECTION OF TRAVEL →

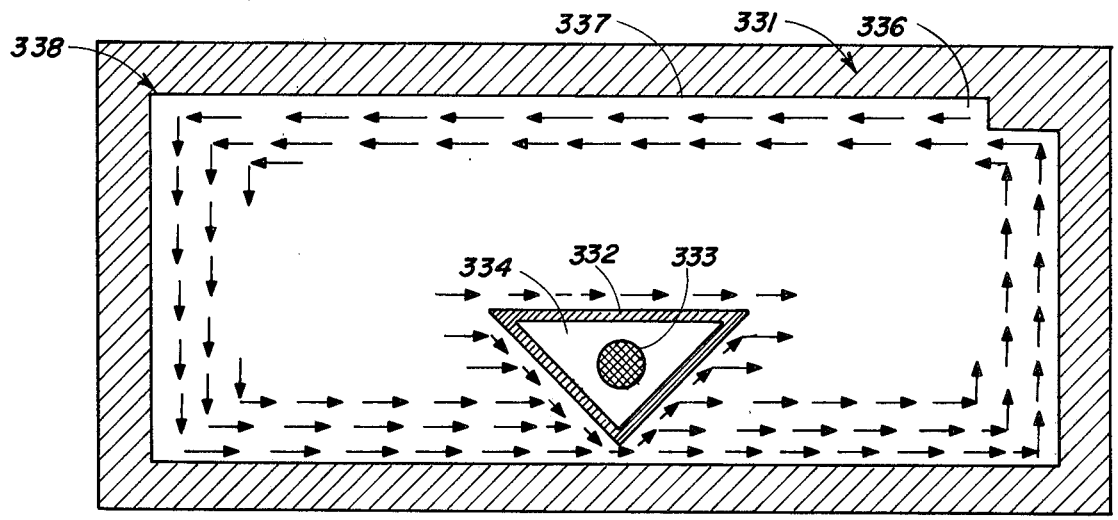
Fig. 27
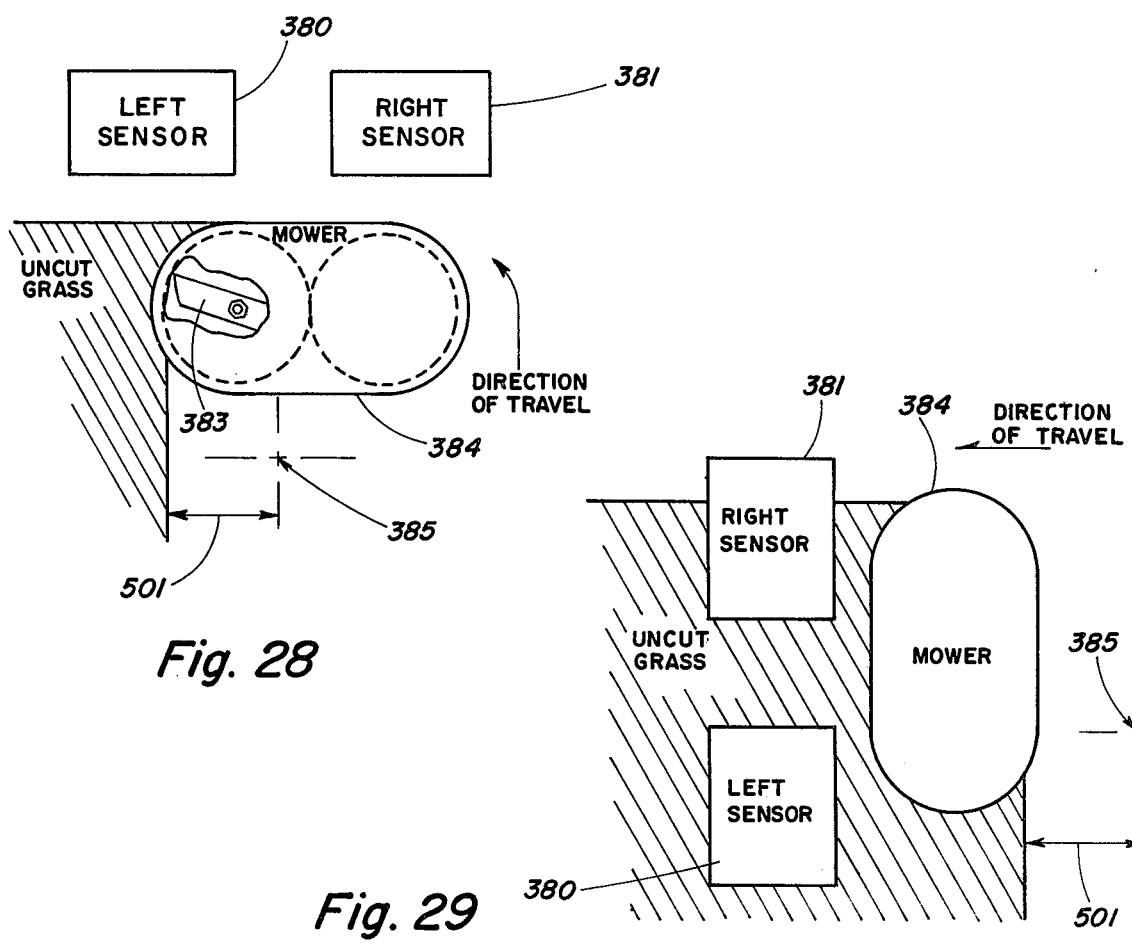
Fig. 28
Fig. 29

- ● DENOTES PHOTOCONDUCTORS WITH CURRENT SOURCES APPLIED TO EACH AND MODULATED IN THE SAME PHASE.
- ○ DENOTES PHOTOCONDUCTORS WITH CURRENT SOURCES APPLIED TO EACH AND MODULATED IN THE SAME PHASE BUT OPPOSITE THE PHASE OF PHOTOCONDUCTORS DENOTED BY ●

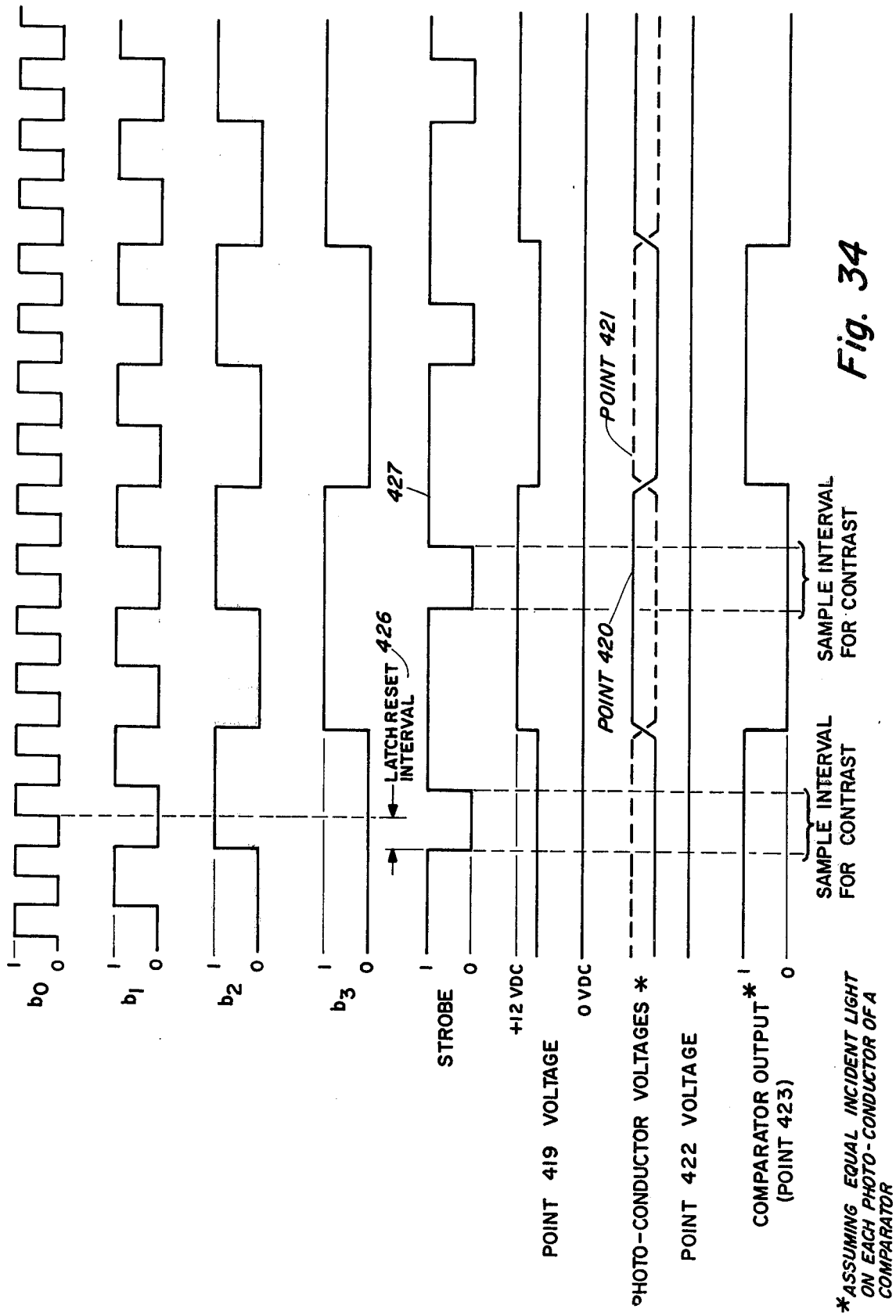

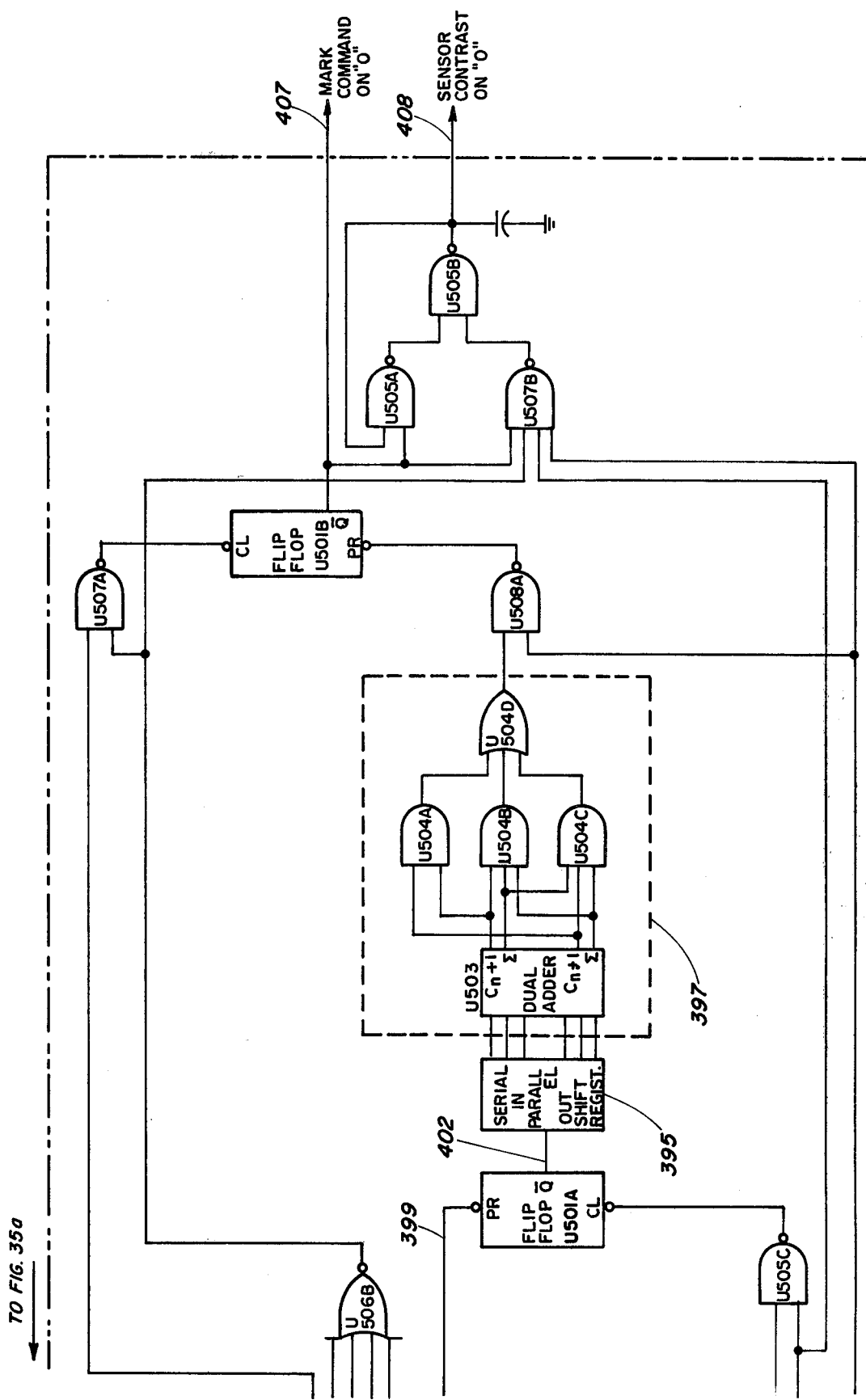

AUTOMATIC LAWN MOWER

CROSS-REFERENCE TO RELATED APPLICATION

This application is a continuation-in-part of patent application, Ser. No. 571,587, filed Apr. 25, 1975, now abandoned.

BACKGROUND OF THE INVENTION

This invention relates to automatic cutting apparatus having steering controlled by an automatic optical tracking system.

Various remote control lawn mowers have been developed to mow grass or other vegetation without requiring the operator to steer the mower while riding on or walking behind it. Radio control is a common communication link. However, because the steering requires the full attention of the operator and because his ability to steer at a distance is limited by visibility, the marketing potential for this type of system is limited.

Other methods of self-tracking are within the state of the art but require expensive fixed installations of a track, either mechanically, electronically or magnetically coupled. Other systems require complex and costly triangulation systems to establish location. A lawn mower apparatus which cuts randomly within a boundary and drive means therefore are shown in U.S. Pat. No. 3,550,714 and 3,570,227, both to Bellinger. U.S. Pat. No. 3,566,988 to Wise shows a driverless lawn mower which mows a straight line path, reverses direction, steers an offset distance and continues. This cycle is repeated until the area is mowed. The Wise apparatus makes no provision for guidance correction means or tracking.

U.S. Pat. No. 3,425,197 to Kita shows an automatic lawn mower which tracks in an essentially spiral pattern to cut an area of grass utilizing mechanical sensors to detect cut and uncut areas. When a light detector senses cut grass, the right drive wheel stops, and when it senses uncut grass, the right wheel drives. When the left detector senses cut grass, the left wheel drives, and when it senses uncut grass, the left wheel stops. U.S. Pat. No. 3,235,023 to Gilmer shows a guidance system for landworking machinery which deposits a path of reflective spheres as it tracks in a generally spiral configuration. A light source of parallel rays is reflected from the path of spheres and the degree of light dispersion is detected. This system uses a light comparator for detecting differences measured by two photo detectors to operate a servo system.

An automatic lawn mower according to the present invention provides automatic and accurate guidance for a self-propelled lawn mower at a comparatively low cost without requiring a fixed installation tracking system or any control equipment in a remote location.

The presently disclosed apparatus includes a self-propelled lawn mower which provides a mobile platform for all tracking detection and guidance equipment to make it a self-contained automatic lawn mower. The apparatus might also be used for harvesting certain farm crops or for the removal of other vegetation. The presently disclosed embodiment provides engine power transfer through a differential to two rear wheels. In another embodiment, engine power transfer occurs through hydraulic coupling to the two rear wheels. All other wheels are castor wheels to permit steering by actuating a right or left brake which stops the respective right or left rear wheel. Drive power is applied only to the opposite rear wheel and a turn is thereby executed. Each brake is actuated by a solenoid which is controlled by guidance electronics on the mower platform. Provisions exist for manual steering to and from the mowing site, and double swivel action castor wheels are utilized to permit free movement during sharp turning maneuvers. The relative position of the two rear wheels with respect to the mower blades affects the maneuverability. These wheels are offset to the right to favor left turns enabling the mower to execute a right angle left turn without leaving uncut grass to the right of its path during the turn.

In another embodiment of the invention steering is accomplished by varying the speed ratio of the two independently driven rear wheels in proportion to the degree of steering error. Major steering error corrections and corner turning maneuverability are accomplished by powering one rear wheel forward and the other in reverse.

The automatic lawn mower embodiment presently disclosed is designed to track on the transition line between the cut and the uncut grass. The operator mows an outline boundary of the intended mowing area and mows a boundary around all obstacles which must be bypassed by the mower using a separate mowing device. The operator does not mow a path to and from the obstacle boundaries. A margin of uncut grass to the inside of an obstacle boundary is left for detection for tracking while the apparatus bypasses the obstacle. This pre-mowing establishes an outline pattern for automatic tracking. The automatic lawn mower apparatus is pre-programmed to provide right or left steering commands based upon the data received from a right and a left sensor while tracking the grass height transition within the mowing boundary.

The right sensor provides tracking data which causes the mower to cut grass in a normal mode. The right sensor has priority and when usable tracking data is no longer available from the right sensor, the left sensor is interrogated for recognition of obstacle bypass commands. If a transition line cannot be detected from either sensor, the mower executes a left turn until the right sensor regains control. This defines a normal left turn sequence.

If the left sensor recognizes an obstacle during a normal sequence, it retains guidance control and steers the left edge of the mower cutting path to the right of the tracking center line and tracks on the grass transition preset around the obstacle. The left sensor retains guidance control until the right sensor again recognizes a grass level transition line. The right sensor then regains control. This procedure defines the sequence where an obstacle is bypassed causing the mower to leave the straight line path of normal mowing, bypass the obstacle, and subsequently reunite with the straight line path.

The sensor detectors consist of a plurality of photoconductors passing a nearly constant current flow. The photoconductors are spaced at intervals on a line perpendicular to the grass transition line. The sensors have their own light source, and many comparisons of voltage across pairs of photoconductors are made. When the grass transition line falls between photoconductors of a pair being compared, a substantial voltage difference occurs. This occurs because the light intensity received by the photoconductors from the sensor light source is altered by the level of the grass. In another embodiment of the invention, the light intensity received by the photoconductors from the sensor light source is altered by the level of the grass through light switch actuators. The present mower apparatus utilizes a noise suppression circuit which also makes it possible to determine if the higher level grass is on the left or on the right of the grass transition line. The noise suppression circuit requires threshold level triggering before a photoconductor comparison difference is recognized.

Many comparator circuits supply data which is multiplexed into a single output to provide a scanning operation from left to right. The comparator spacings are set up to permit the grass transition line to fall between the detector pair of more than three comparators. Consequently, the multiplexer provides a short duration pulse when each of these comparators is sampled during a scan. The pulses are counted and a latch circuit is actuated when three pulses have been detected. Noise response is suppressed since three concurring comparator indications are required. When a third pulse is detected, an output logic 1 level signal is changed to a logic 0 signal. If the transition from a logic 1 to a logic 0 occurs midway in the scanning pattern and reoccurs each cycle, the on time of the waveform is equal to the off time. This condition represents a case where there is no guidance error, and the grass transition line is located centrally of the photoconductor array. An unbalance of the on and off times indicates a need for steering correction and indicates the direction of the correction necessary. This unbalance signal is used to apply a series RC circuit to a DC voltage source on the on interval and apply it to 0 volts on the off interval. The voltage across the capacitor then becomes a nominal DC voltage with a relatively small ripple superimposed.

In another embodiment of the present invention, the comparator spacings are set up to permit the grass transition line to fall between the detector pair of seven comparators. Consequently, the multiplexer provides a short duration pulse when each of these comparators is sampled during a scan. The pulses are counted and a latch circuit is actuated when four of six consecutive pulses have been detected. Noise response is suppressed since four concurring comparator indications are required. When a fourth pulse is detected, an output logic 1 level signal is changed to a logic 0 signal.

If the on and off intervals are balanced, the nominal DC voltage on the capacitor becomes half of the DC voltage source. A threshold circuit is then provided to command the mower steering to turn right if the nominal DC voltage across the capacitor exceeds a predetermined margin above normal and to turn left if it is less than normal by a predetermined margin. At the conclusion of mowing, the sensors can no longer detect a grass transition line, and the mower circles counterclockwise in the same manner it would to execute a left turn. After a preset time interval, the mower engine is turned off, and shortly thereafter, the electric power is removed from most circuitry.

SUMMARY OF THE INVENTION

One embodiment of the present invention is a guidance apparatus for a self-propelled mower comprising sensor means, including several photosensitive receptors and light source means for directing light toward said receptors, for producing output signals associated with each said receptor dependent upon the light received by each said receptor, comparator means for comparing predetermined combinations of said output signals and for producing comparator output signals dependent upon said comparisons, and control means for producing guidance signals for a self-propelled mowing apparatus in response to the content of said comparator output signals, the light source means and the photosensitive receptors being positioned relative to one another such that the interposition therebetween of a substance to be mowed affects the light received by the receptors.

It is an object of the present invention to provide a guidance apparatus for a self-propelled lawn mower which includes sensing means for tracking the cut-uncut grass interface with light-sensitive detectors.

It is a further object of the present invention to provide such a guidance apparatus which further includes comparator means for comparing the output of the detectors to determine the position of the cut-uncut grass interface.

It is a still further object of the present invention to provide such a guidance apparatus which includes means for guiding a lawn mower around obstacles within the area to be mowed.

Further objects and advantages of the present invention shall be apparent from the following detailed description and accompanying figures.

BRIEF DESCRIPTION OF THE DRAWINGS

FIG. 5 is an illustration of the cutting and precutting pattern of an area to be mowed using the apparatus of FIG. 1.

FIG. 9 is a side view of a castor wheel of the automatic lawn mower of FIG. 1 enabling greater than 90° wheel pivoting.

FIG. 10 includes FIGS. 10A, 10B, 10C and 10D and illustrates the progressive positions of the castor wheel of FIG. 9 in changing direction by an angle greater than 90°.

FIG. 13 is a chart illustrating the waveforms of various signals and timing signals in the system.

FIG. 15 is a schematic representation of circuitry for the generation of timing interval control.

FIG. 16 is a diagrammatic illustration of the location of photoconductor elements within the sensor assembly.

FIG. 17 is a schematic representation of the circuitry which processes comparison measurements with the center recognition scanner of the sensor assembly.

FIG. 18 is a schematic representation of the circuitry for developing turn commands from the center recognition scanner output.

FIG. 27 is an illustration of the cutting and precutting pattern of an area to be mowed using the apparatus of FIG. 22.

FIG. 28 is a diagrammatic showing of the sensor assembly and blade assembly of the mower of FIG. 22 prior to making a standard left turn.

FIG. 29 is a diagrammatic showing similar to FIG. 28 but after the mower has executed a left turn.

FIG. 34 is a chart illustrating the waveforms of various signals and timing signals in the system.

FIGS. 35a and 35b comprise an overall schematic representation of the sensor unit.

DESCRIPTION OF THE PREFERRED EMBODIMENT

Figure 1:
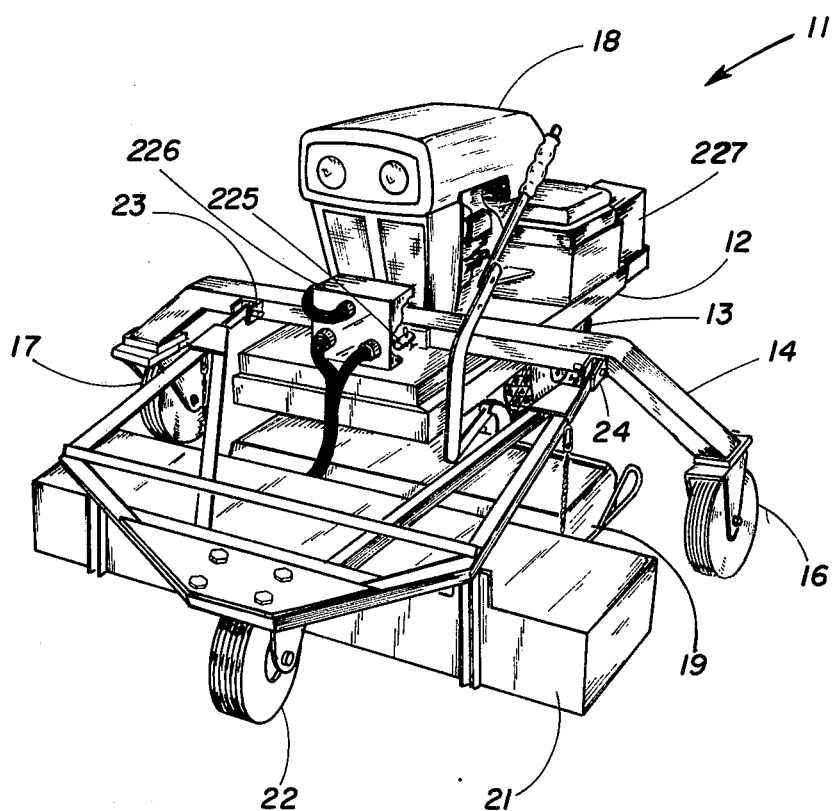
FIG. 1 is a perspective view of an automatic lawn mower according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to FIG. 1, there is shown an automatic lawn mower apparatus 11 according to the present invention. Mower 11 includes a frame 12 which is supported at three positions consisting of the two rear wheels such as 13 and the pivot point 225 on the front axle 14. Two double swivel action castor wheels 16 and 17 are mounted to the front axle. The frame 12 supports the engine in housing 18 and all power train components. It also supports the mower unit 19. A sensor assembly is supported by a forward structure 21, which is in turn supported at three points by a castor wheel 22 and hinge points 23 and 24 on the front axle 14. Consequently, the frame 12 and forward structure 21 form two platforms which are maintained in alignment in the direction of travel but are otherwise free to float with the ground contour.

Figure 2:
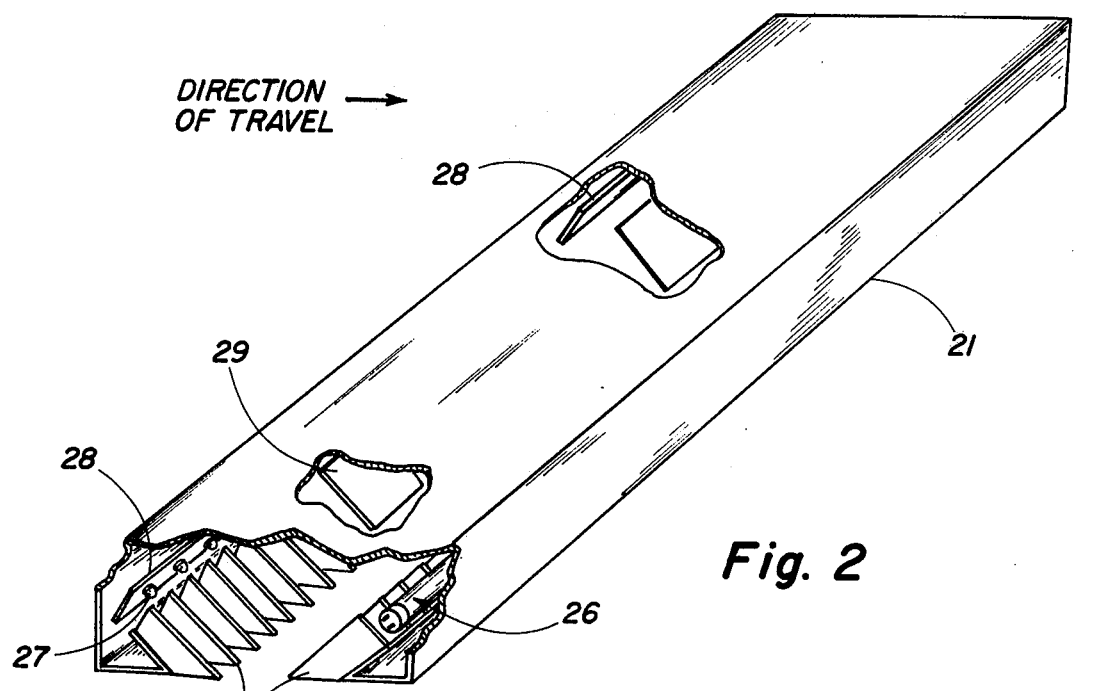
FIG. 2 is an enlarged view of the sensor assembly of the mower of FIG. 1 with a portion removed.

Referring now to FIG. 2, sensor assembly 21 is shown with a portion removed, showing compartments having open ends formed by light dividers 25 and the sensor assembly 21 structure. A fluorescent light source 26, coupled from the source of electrical power rearwardly on the mower apparatus, emits light which exits through the compartments beneath light source 26 and out of the bottom of sensor assembly 21. Since the sensor assembly 21 shades the area beneath it, light source 26 is the predominant source. By means to be explained herein, some of this emitted light is reflected back into the compartments formed at the left side of sensor assembly 21 as shown in FIG. 2. The light reaches photoconductor detectors 27. Right sensor circuit board 28 contains a plurality of detectors 27 at fixed intervals and locates each into an individual compartment. Left sensor circuit board 28' is identical to right sensor circuit board 28.

Figure 3:
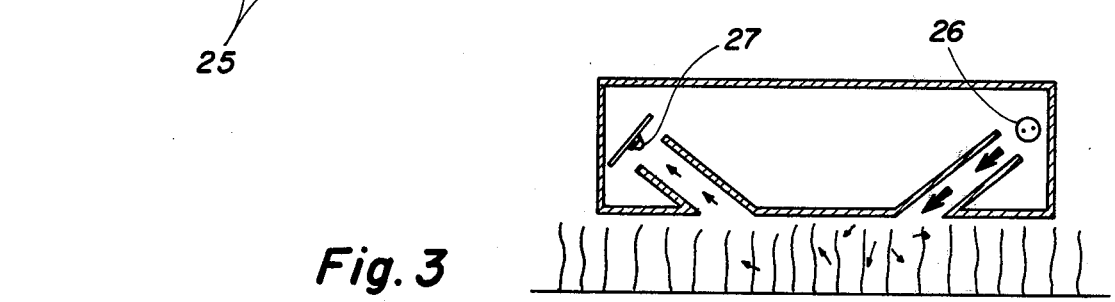
FIG. 3 is a diagrammatic representation of the operation of a photoconductor in the sensor assembly of FIG. 2 in a long grass configuration.
Figure 4:
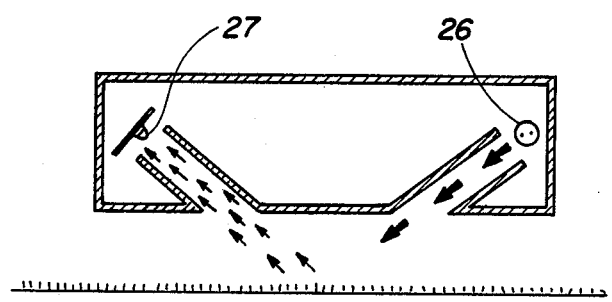
FIG. 4 is a diagrammatic representation of a photoconductor in the sensor assembly of FIG. 2 in a short grass configuration.

FIG. 3 shows a cross-section of the sensor assembly 21 of FIG. 2 with tall grass, representative of uncut grass, beneath it. FIG. 3 shows light source 26 and the light dispersion and blocking resulting from grass interference, which prevents a large amount of light from reaching detectors 27. FIG. 4 shows a cross section similar to that of FIG. 3 except the grass level beneath the assembly 21 is short grass, representative of cut grass. Light emitting from source 26 is reflected from the ground surface and short grass and a relatively large amount of light reaches detector 27.

All walls of the compartments are nonreflective surfaces. Note, in both FIGS. 3 and 4, that the light exiting and entering the compartments of the sensor assembly is channeled into a single direction. The compartment depth and width, defined by the spacing of adjacent light dividers 25 in FIG. 2, and their width respectively, is less than the length of the compartment in the direction of light travel. Therefore, the light is channeled into a single direction in both planes. This condition is hereinafter referred to as columnized light. Assuming that FIG. 3 and FIG. 4 represent sensor assembly 21 cross-sections of two adjacent compartments, the grass transition line would be between the compartments. The resolution between the two adjacent detector responses to the amount of light received would depend largely upon the extent to which the light is columnized when being emitted and when reaching the detector. Also shown in FIG. 2 are circuit boards 29.

FIG. 5 shows a sector of a lawn to be mowed and defines the mowing pattern utilized to enable self-tracking of the automatic lawn mower according to the present invention. An outside boundary 31 is mowed with a different mowing device. A border 32 is also mowed around all obstacles such as 33. A fixed installation causing light contrast could be substituted for mowed boundaries. Note the margin of uncut grass 34 around the obstacle and within the triangularly shaped border 32. The automatic lawn mower is prepositioned to begin at the point indicated 36. The right sensor of the automatic lawn mower tracks on the initial cut-uncut grass transition line 37 until the sensor assembly of the present embodiment overhangs into the cut grass at the corner 38.

Figure 6:
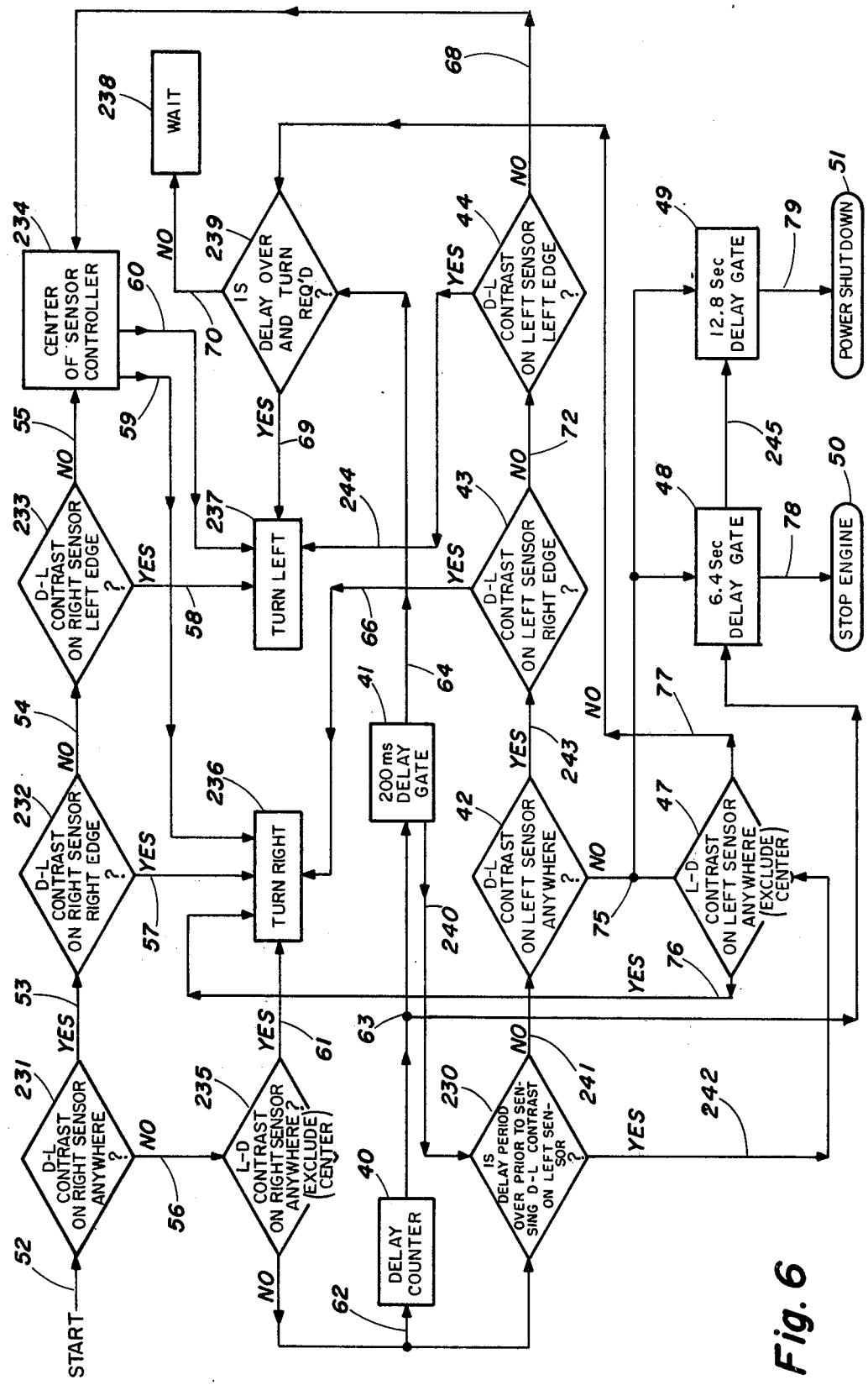
FIG. 6 is a state diagram defining the preprogrammed automatic lawn mower response to light measurements from the sensors.

Referring momentarily to FIG. 6, there is illustrated a state diagram defining the preprogramed decisions of the logic system of the present lawn mower. The normal mode of operation for lawn mower 11 is to travel in a counterclockwise direction, as shown in FIG. 5, with the interface, or transition line, between cut and uncut grass centered beneath the right sensor assembly. The contrast on the right sensor shall be defined as D-L contrast, that is, facing in the direction of travel of mower 11 and viewing from left to right, the contrast in the received light at the detectors in the right sensor goes from dark (tall grass) to light (cut grass). This D-L contrast centered on the right sensor is the normal mode of operation for mower 11 as it proceeds along a straight line edge as shown in FIG. 5.

Referring back to FIG. 6, the state diagram of FIG. 6 is essentially self-explanatory but the normal mode and left turn modes will be discussed briefly herein. Starting at point 52, junction 231 requires a decision as to whether or not there is D-L contrast anywhere on the right sensor. With the right sensor center section tracking the cut-uncut grass interface, the answer to this inquiry is yes and proceeding along line 53, junction 232 is reached. Junction 232 requires a decision as to whether or not there is D-L contrast on the right edge of the right sensor. If this were the case, a right turn at box 236 would be initiated along line 57. Again, during normal operation, the answer to this inquiry would be no and proceeding along line 54 junction 233 would be reached. If there is D-L contrast on the left edge of the right sensor, a left turn at box 237 is initiated through line 58. If, as in normal operation along a side of the lawn to be mowed, there is no contrast at the left edge of the right sensor, proceed along line 55 to center of sensor controller 234. The center sensor controller will execute minor corrections through lines 59 and 60 to make small right or left turns to maintain the D-L interface centered on the center sensor section. When a corner such as 38 (FIG. 5) is reached, the D-L contrast is not present on the right sensor and path 56 from junction 231 is followed. This leads to junction 235 wherein the inquiry as to the presence of L-D contrast on the right sensor must be answered. If the automatic lawn mower were positioned opposite the direction of the arrow at start 36 on initial grass transition line 37, the light indication would be on the left and the dark indication would be on the right. This condition will hereafter be referred to as L-D contrast. Typically, there is no L-D contrast at a corner, and a path is followed to delay counter 40 along line 62 and also to junction 230.

Delay counter 40 activates delay gate 41 and delay gate 48 if junctions 230 and 42 have "No" decisions. Delay gate 48 is coupled to the engine and power shut down circuitry, and delay gate 41 is coupled to junction 239. As the sensors move into the cut grass border 31 at a corner such as 38, at decision block 230, if the delay of delay gate 41 is over, and there is no contrast detected on the left sensor, the path is followed from junction 230 to junction 42 to junction 47 and to junction 239. After the delay has expired, the turn left command of box 237 is executed, and the right sensor again resumes control of the guidance of the lawn mower along the uncut-cut grass interface below corner 38.

The cornering sequence is repeated at each corner as shown in FIG. 5. When the right sensor detects only cut grass but the left sensor detects uncut grass 34 prior to the end of the time delay normally delaying left turns, the left sensor assumes tracking control. Thus, the mower tracks the interface between cut border 32 and uncut area 34 in a counterclockwise direction until the right sensor again detects contrast between cut and uncut grass. The right sensor then regains control and realigns the automatic lawn mower on the straight grass transition line along the border of the remaining lawn to be mowed. The sequence reoccurs each lap until the obstacle is bypassed. When no more uncut grass can be detected, the automatic lawn mower circles counterclockwise and is then automatically stopped, as shown at decision boxes 48 and 49 (FIG. 6).

Figure 7:
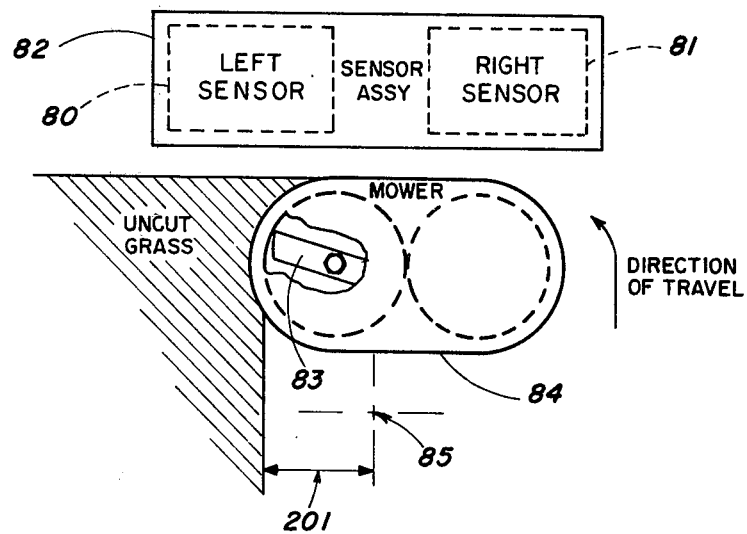
FIG. 7 is a diagrammatic showing of the sensor assembly and blade assembly of the mower of FIG. 1 prior to making a standard left turn.
Figure 8:
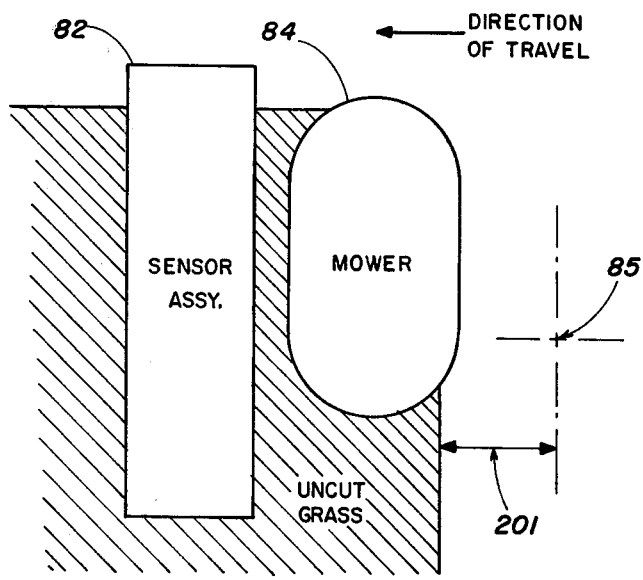
FIG. 8 is a diagrammatic showing similar to FIG. 7 but after the mower has executed a left turn.

Referring now to FIG. 7, the relative locations of the sensor assembly, generally indicated 82, mower unit 84 and pivot point 85, for executing the turns, are shown to illustrate the positions at initiation of a right angle left turn. FIG. 8 illustrates the same elements, as shown in FIG. 7, at the completion of a right-angle left turn. Pivot point 85 in FIGS. 7 and 8 is the same point with the sensor assembly 82 and mower unit 84 remaining in the same relative position because of the mounting configuration of the main structure as shown in FIG. 1. It can be seen from the final position of FIG. 8 that the mower unit 84 is in position to mow after the right angle turn without leaving uncut grass during the turn. The pivot point offset 201 is essential to obtain right angle turn capability. For this embodiment, the left rear wheel is located at pivot point 85. When braking action is applied to the left rear wheel, the automatic lawn mower pivots about this point. An alternate method of pivoting about the position would be to employ two independently driven hydraulic motors; one to power each of the rear wheels. When turning left, the right wheel would be driven forward and the left wheel would be driven in reverse. If the forward and reverse drive speeds were chosen to be equal, the pivot point would be midway between the rear wheels. If this midway position coincided with the pivot point offset 201 of FIG. 7, a wide stance on the rear wheels could be utilized which would offer additional stability. Equal right or left turn capabilities could be realized if the pivot point offset 201 coincided with the center line of the mower unit 84.

Referring now to FIG. 9, a double swivel castor wheel configuration is shown. A first swivel base 87 and a wheel 88 form a conventional castor wheel. A second swivel base 86 is attached to the first swivel base 87. The offset 202 between the swivel bases establishes the offset between the center of the swivel action on both swivel bases. The second swivel base 86 is mounted on an end of the front axle of the automatic lawn mower as shown in FIG. 1; two double swivel castor wheels are attached to this axle. The advantage of the double swivel castor wheels is the degree of maneuverability that the automatic lawn mower has when employing this castor wheel design. As shown in FIG. 1, these wheels become outrigger wheels since they project laterally beyond the rear wheels. When the automatic lawn mower executes a turn, the pivot point is on the rear wheel where braking action is applied. The front axle wheel on the inside of the turn is then required to turn at an angle greater than 90°. Conventional castor wheels will drag without rolling under many conditions of turns greater than 90°. The double swivel castor wheels of the invention are not required to roll until realigning occurs caused by a torque applied to the wheel. The resultant drag on the forward motion of the automatic lawn mower is substantially reduced by the action of the second swivel.

FIG. 10 illustrates progressive positions of the double swivel castor wheel as the direction of travel of the automatic lawn mower, at the wheel location, is changed from direction 203 to an angle greater than 90° from the initial direction. FIG. 10 depicts a linkage from point 91 to point 89. This linkage is equivalent to the second swivel base 86 of FIG. 9. It is shown as a linkage to simplify the illustration of the motion involved. Point 89 is equivalent to the swivel center of the second swivel base 86 at the attachment point to the automatic lawn mower front axle. As point 89 travels from the direction shown for the first position in FIG. 10A, point 92 remains the same stationary point in all positions. Point 90 is shown as a reference point to indicate the initial position of point 89. As point 89 traverses from point 90 to that shown for the position of FIG. 10D, wheel 205 is rotated into a realigned position without any rolling action required. In practice, the wheel may roll from position 92; however, if force were applied to it to cause it to stop, this would not inhibit the motion of point 89. This double swivel castor wheel design would be applicable on several moving platforms where a turn greater than 90° is anticipated.

Figure 11:
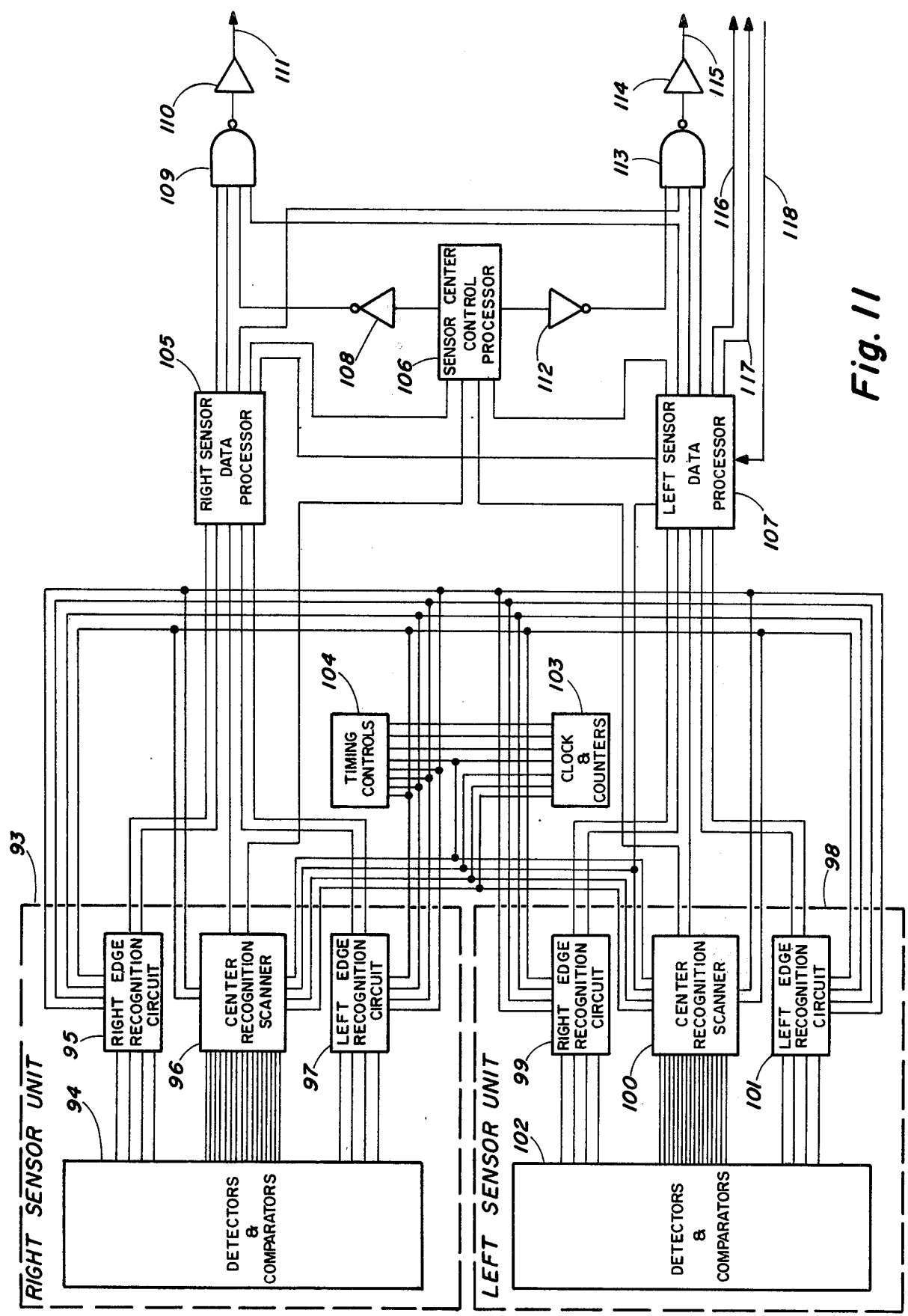
FIG. 11 is a block diagram of the electrical position of the mower of FIG. 1 showing the development of steering commands.
Figure 14:
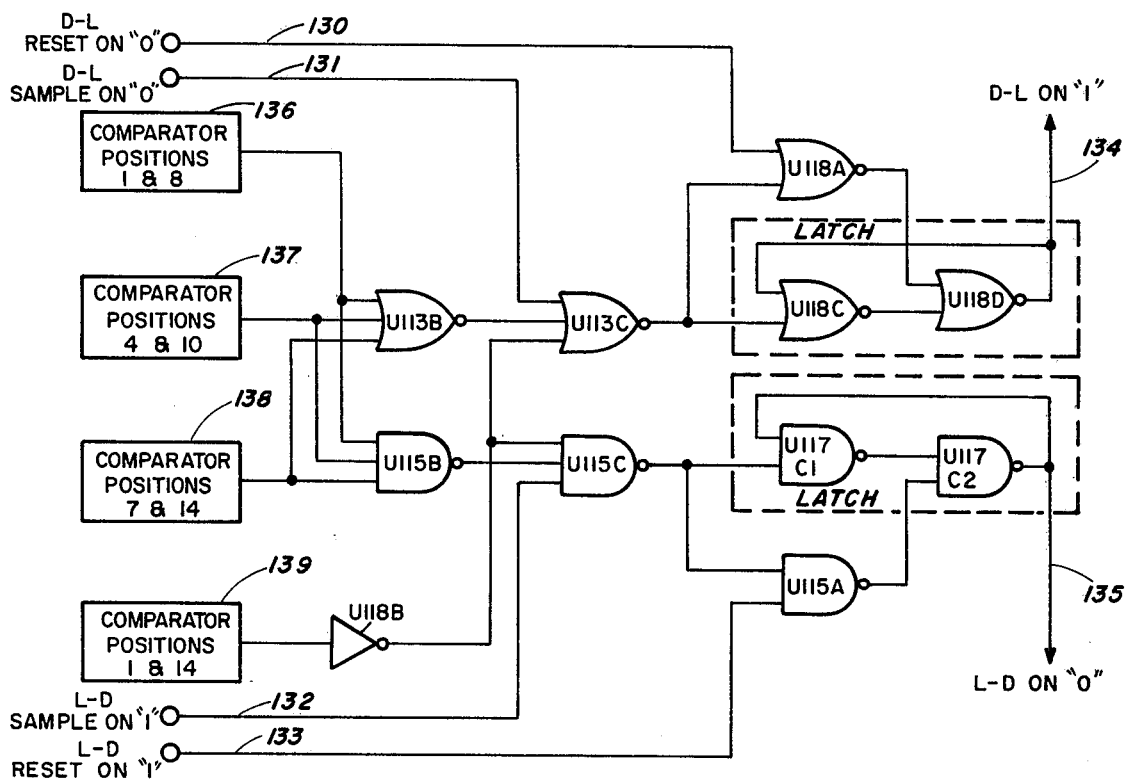
FIG. 14 is a schematic representation of the circuitry for processing detector comparison results from either edge of a sensor.
Figure 20:
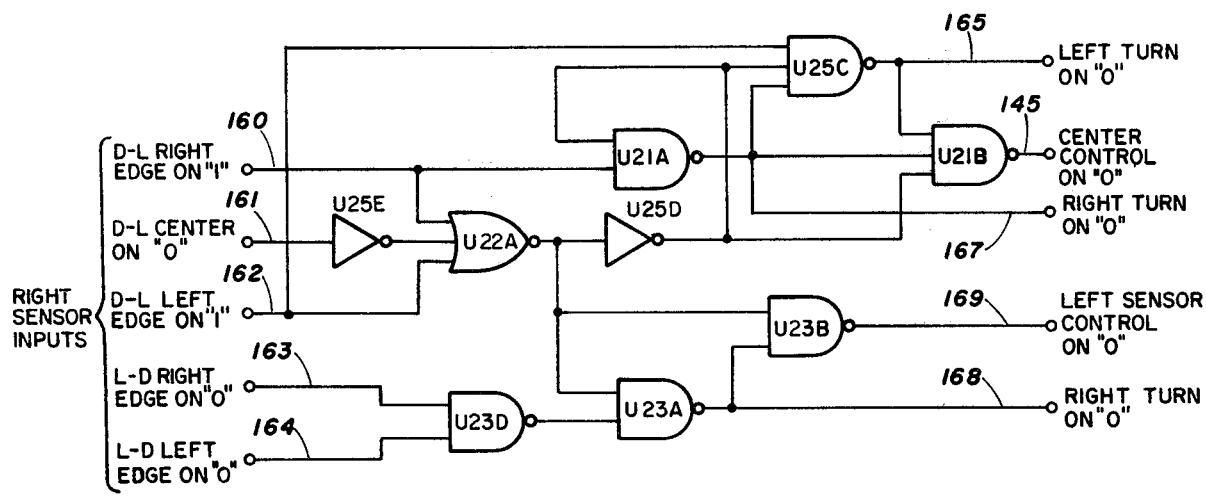
FIG. 20 is a schematic representation of a circuit for processing data from the right sensor.
Figure 21:
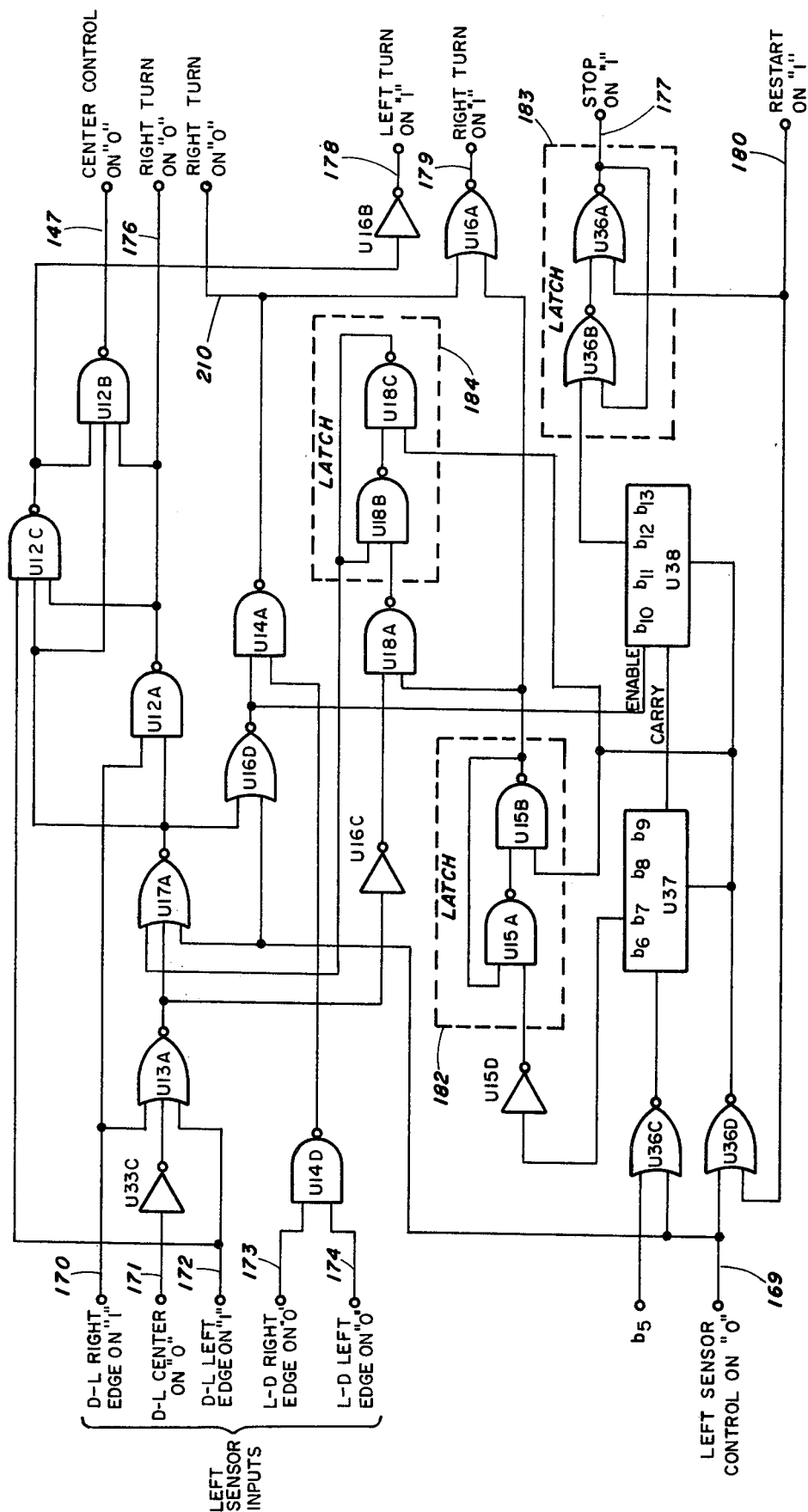
FIG. 21 is a schematic representation of a circuit for processing data from the left sensor.

Referring now to the block diagram of FIG. 11, the electrical controls of the system are illustrated. The detector and comparator units 94 and 102 of FIG. 11 are shown in greater detail hereinafter in FIG. 12. FIG. 14 defines the content of the right edge recognition circuits 95 and 99 and also the left edge recognition circuits 97 and 101. FIG. 17 defines the content of the center recognition scanners 96 and 100. FIG. 15 defines the content of the timing controls 104, and FIG. 20 illustrates the content of the right sensor data processor 105. FIG. 21 shows the content of the left sensor data processor 107. FIG. 18 defines the content of the sensor center control processor 106.

The right sensor unit 93 is the same interiorly as left sensor unit 98, and therefore, only the right sensor assembly 93 will be discussed in detail herein. The detectors and comparators 94 optically sense the difference in grass height of many detector pairs and provide these outputs. In a preferred embodiment of the present lawn mower, sensor unit 93 includes 28 photoresistors mounted in a plurality of 33 possible positions along sensor unit 94. Twenty-four comparisons of light received by the photoresistors are made and used as outputs. Sixteen of these outputs are sensed by the center recognition scanner 96 which sequentially samples these outputs. Starting with outputs representative of comparison measurements made to the left of the center span, the scanning proceeds to the measurements representative of the right of the center span.

The right edge recognition circuit 95 and left edge recognition circuit 97 each provides static outputs, providing the detector inputs remain unchanged. System timing for scanning and other sampling functions is provided by the clock and counters 103 and timing controls 104. The functions of the clock and counters 103 are accomplished by means which are common in practice and will not be explained in detail.

The right sensor data processor 105 converts data from the right sensor unit 93 to right, left or no turn commands when data is available on the sensor unit edges. When processor 105 does not indicate that grass level contrast has been detected anywhere from the right sensor unit 93, left sensor data processor 107 converts data from the left sensor unit 98 to right, left or no turn commands when data is available on the sensor unit edges. When data from the left sensor unit 98 does not indicate grass contrast, the left sensor data processor 107 retains timing control on left turns and automatic shut down. The sensor center control processor 106 receives timing data from the center recognition scanner 96 or 100 and converts it to right, left or no turn commands when the data indicates grass contrast has been detected.

The right turn inputs are applied to gate 109 which actuates solenoid driver 110 when any one input commands a right turn. Likewise, left turn inputs are applied to gate 113 which actuates solenoid driver 114 when any one input commands a left turn. Solenoid drivers actuate solenoids which apply braking action (through a hydraulic brake system) to the appropriate drive wheel of the automatic lawn mower. Right and left turn command outputs appear in FIGS. 18, 20 and 21. These outputs are inverted, when necessary, to obtain left turn on "0" or right turn of "0" conditions. They are then routed to separate inputs of gates 113 or 109 of FIG. 11, respectively. The appearance of a "0" on any input then initiates a turn.

Figure 12:
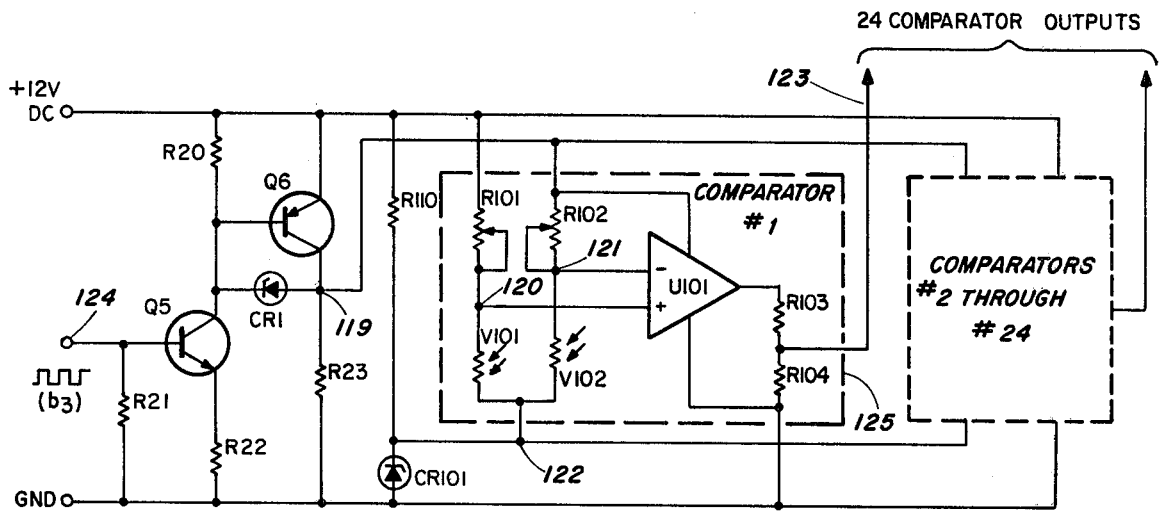
FIG. 12 is a schematic representation of the sensor light detector and comparator circuitry.

Referring now to FIG. 12, the comparator measurement circuitry is shown for one comparator which is representative of each of the 24 comparators contained for either detector and comparator block 94 or 102. The waveform of points indicated as 119 and 124 (FIG. 12) are shown in FIG. 13. The generation of the waveform at point 119 from the input at 124 is developed by Q5, Q6, CR1, R20, R21, R22 and R23. Zener diode CR101 provides a bias voltage to point 122 to prevent clipping of the input signals to the comparator U101. Adjustable resistors R101 and R102 substantially exceed the resistance of photoconductors V101 and V102. Therefore, an approximate constant current flows through photoconductors V101 and V102. The adjustable resistors are adjusted to provide the waveform at points 120 and 121 as shown in FIG. 13 when equal light is applied to photoconductors V101 and V102.

The comparator output will then be as shown in FIG. 12 at point 123 (FIG. 13). If the light intensity applied to photoconductor V101 significantly exceeds that on V102, the resistance of photoconductor V102 will exceed that of photoconductor V101 and the voltage at point 121 will always exceed that at point 120. The comparator U101 output will be 0 volts (logic 0) in this condition. Conversely, if the difference is applied light intensity is reversed, the comparator output U101 is a continuous DC voltage output (logic 1). Contrast will be detected in both of the instances. However, if the difference in applied light intensity is not large, point 120 may be shifted up or down with respect to 121 (as shown clearly in FIG. 13), but the two signals still will cross every half cycle. This represents a condition where contrast is not recognized and explains how noise inputs are suppressed.

The polarity of U101 is as shown in the drawing in FIG. 12 if the photoconductor on the left is farther to the left physically in the system than the one shown on the right. If the photoconductor positions are reversed in the system (and some are), the polarity of U101 is reversed. In the waveforms of FIG. 13 and in the description herein, terms b0, b1, b2, through b13 apply to binary bits from a chain of counters driven by a clock, and bit b0 is the lowest order bit. The outputs of the comparators and the orientation of U101 is such that a 0 output indicates L-D contrast and a logic 1 output indicates D-L contrast.

Referring now to FIG. 14, the circuitry is illustrated for development of contrast measurement decisions. The circuit shown is for one of the edge recognition circuits such as 95 or 97 in FIG. 11. Blocks 136, 137, 138 and 139 refer to numbered comparator positions which can be correlated to the numbered positions of FIG. 16 to determine physical locations within a sensor unit. Referring for a moment to FIG. 16, the array of photoconductors for a detector and comparator portion such as 94 is shown. There are a potential 33 positions occupied by 28 photoconductors as shown. The photoconductors indicated as solid circles are those photoconductors used in right or left edge sensor circuitry, although some of these might also be used for comparisons for the center recognition scanner. Odd positions from 5 to 27 are each connected in series with a resistor across a 12 volt DC source; even positions are each connected in series with a resistor to the pulsed voltage level source (see point 119 of FIG. 12). Positions 1 and 4 are wired the same as the odd positions, and positions 28, 30 and 33 are wired the same as the even positions.

As indicated above in regard to FIGS. 12 and 13, a continuous output of logic 0 represents detection of L-D contrast, and a continuous output of a logic 1 represents D-L contrast, and the comparator output waveform shown in FIG. 13 represents no contrast detected. If no D-L contrast exists, all of comparators 136, 137 and 138 develop a logic 0 output during a sample interval for D-L contrast, gate U113B develops a logic 1 output, gate U113C develops a logic 0 and D-L contrast is not detected by latching circuit gates U118C and U118D. However, if any one of comparators 136, 137 or 138 develop a logic 1 output during a sample interval for D-L contrast, gate U113B develops a logic 0 output. If any one of comparators 136, 137 or 138 detects D-L contrast, comparator 139 should also detect the contrast since it spans from positions 1 to 14 which includes all of the area spanned by the other three comparators. Therefore, all three inputs to gate U113C would be a logic 0 during the D-L sample interval, and gate U113C would develop a logic 1 output which causes the latching circuit to latch, providing a logic 1 output.

D-L reset signal 130 input to gate U118A provides a means for unlatching the circuit when D-L contrast is no longer detected. The D-L reset interval occurs each cycle of the scanning period coincident with the D-L sample interval but for shorter duration (see FIG. 13). The output from comparator 139 must concur with contrast detection from one of the other three comparators for the latching circuit to register D-L contrast at output 134. Similarly, concurrence is required to register L-D contrast at output 135. If no L-D contrast exists, all of comparators 136, 137 and 138 develop a logic 1 output during a sample interval for L-D contrast, gate U115B develops a logic 0, gate U115C develops a logic 1 and L-D contrast is not detected by latching circuit gates U117C1 and U117C2.

However, if any one of comparators 136, 137 or 138 develops a logic 0 output during a sample interval for L-D contrast, gate U115B develops a logic 1 output. When comparator 139 concurs with L-D contrast detection, gate U115C develops a logic 0 during the L-D sample interval and causes the latching circuit to provide a logic 0 output at 135. Gate U115A provides a means for resetting the latching circuit similar to that for the D-L latching circuit. The circuit of FIG. 14 is used for both the left and right edge recognition circuits, 95 and 97 of FIG. 11.

Referring now to FIG. 15, the circuit is shown for generating the timing intervals for contrast measurements. Input timing signal b0, b1, b2 and b3 are processed to provide various control intervals. The inputs and outputs of this circuit can be related to the waveforms of FIG. 13 for an understanding of the timing intervals. The timing control outputs of FIG. 15 are used as inputs for the circuits of FIGS. 14 and 17.

Referring now to FIG. 16, as indicated above the relative physical locations of the photoconductor detectors within a sensor unit are shown. FIG. 16 shows positions 5 and 12 being compared at the first position of 16 positions during multiplexer scanning of the center of the sensor. The span interval for comparator detectors of 7 spaces is maintained throughout the 16 steps in scanning from left to right. If contrast exists between detectors of a comparator, it will be detected for at least three steps during a single scan unless the contrast occurs at the right or left edges of the scanning travel. The right or left edge recognition circuits 95 and 97 of FIG. 11 overlap to include these positions where 3 step detection within the center cannot be detected. The significance of the 3 steps of contrast detection will be explained hereinafter during the discussion of the center recognition scanner circuit.

Referring now to FIG. 17, the center recognition scanner circuit is shown in detail. This circuitry is representative of either center recognition scanner 96 or 100 (FIG. 11). The 16 comparator inputs to the multiplexer 141 are sequentially sampled from the farthest left position to the farthest right position during the D-L sample interval of each position under multiplexer stepping control of inputs b3, b4, b5 and b6. Multiplexer 141 is a type 74150 integrated circuit. Multiplexer 141 provides an output pulse during each step where a D-L contrast is measured. The pulses are counted by binary counter U122, and when 3 pulses have been detected during a single scan, the outputs at 142 and 143 latch into the logic 0 state and remain until reset. The mark command 143 output is reset to a logic 1 shortly after the start of each scan. The D-L center output 142 is reset to a logic 1 at the start of each scan providing 3 counts were not detected during the previous scan. The requirement for detection of three pulses assures the existence of actual contrast and decreases the probability of erroneous tracking caused by irregularities in the lawn. This further enhances the capability of the sensor to reject noise while recognizing actual valid data.

Figure 19:
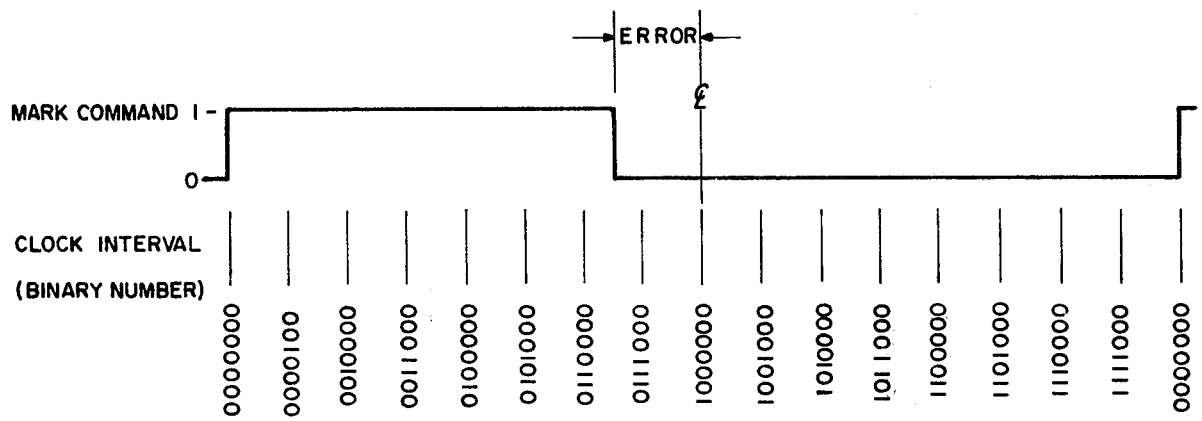
FIG. 19 illustrates a typical waveform developed by the center recognition scanner.

FIG. 19 shows a typical waveform developed for the mark command 143. If the time of a logic 1 output is exactly equal to that of a logic 0, no error exists. For this discussion, an offset caused by the 3 count delay will be ignored since compensation for it may be obviously provided. If the times are unequal, an error condition exists in tracking. The center sensor control processor shown in detail in FIG. 18 interprets the signal such as shown in FIG. 19 to provide the "fine turning" steering control to maintain the cut-uncut lawn interface centered in the center recognition portion of the detectors and comparators.

Referring now to FIG. 18, a circuit is shown which serves as an integrator and comparator for converting an error tracking condition, detected by the center recognition scanner 96 of FIG. 11, into a right or a left turn command. The circuit is enabled to monitor the mark command output 143 of FIG. 17 from the right or left sensor unit (labeled 144 and 146 in FIG. 18) when the center control 145 or 147 input respectively is a logic 0. These signals are shown derived from the circuits of FIGS. 20 and 21, to be discussed infra. One of these signals, the mark command, from the respective sensor, turns on transistor Q2 and Q3 and turns off transistors Q1 and Q4 when it is a logic 1. The conditions are reversed when the mark command is a logic 0. With Q3 turned on and Q4 turned off, capacitor C1 begins charging through resistor R12 from the +12 volt DC source. With Q4 turned on and Q3 turned off, capacitor C1 begins discharging through resistor R12 to a 0 volts potential. When the on times of transistors Q3 and Q4 are equal, the voltage on C1 averages half the +12 volt DC supply voltage. Operational amplifiers U1A and U1B become threshold comparators. When capacitor C1 voltage is near the middle range (½ the +12 volt DC supply voltage), neither comparator provides an output. If capacitor C1 rises to an upper threshold voltage level, comparator U1A provides a right turn command. If capacitor C1 drops to a lower threshold voltage level, comparator U1B provides a left turn command.

Referring now to FIG. 20, a circuit is shown for the development of priorities and of turn commands from data of the right sensor unit. This circuit illustrated is for a right sensor data processor 105 (FIG. 11). When D-L contrast is detected and the contrast is not on the right or left edges, a center control 145 output goes to a logic 0 to enable the circuit of FIG. 18. Control is transferred to the left sensor when a logic 0 appears at output 169. This occurs when contrast is not detected on the right sensor.

Referring now to FIG. 21, the circuit controlling the left sensor data is shown. The circuitry is for the left sensor data processor 107 (FIG. 11). D-L contrast measurements are given priority by the presence of a logic 1 at the output of gate U17A. The development of right or left turn commands at the outputs of gates U12A and U12C caused by D-L contrast and the means for enabling the circuit of FIG. 18 with center control output 147 from gate U12B are similar to that shown for FIG. 20. Gates U14D, U14A and U16A show the development of the left turn command from L-D contrast data. Latch 182 provides a logic 1 when control is initially released from the right sensor and given to the left sensor. After counting is progressed to develop a logic 1 at b7 on counter U37, a logic 0 condition is latched at the output of gate U15B of latch 182. This is reset only when the right sensor regains control. During the time interval, the latch 182 is a logic 1; if D-L contrast is detected, a logic 0 occurs to the input of latch 184 causing a logic 0 condition to latch up at the latch 184 output. This enables gate U17A to assure that the left sensor will track on the D-L contrast after the output of latch 182 goes to a logic 0. If neither D-L nor L-D contrast is detected during the interval, a logic 1 exists at the output of latch 182; when the output goes to logic 0, a left turn command develops at output 179 from gate U16A. This condition occurs during normal left turns at corners of the mowing area. The turn condition remains in effect until the right sensor regains control. Latch 183 provides a stop command when counter U38 provides a logic 1 signal at the b12 output. This counter is enabled only when D-L contrast is not detected on the left sensor and the right sensor has not regained control.

A further embodiment of the present invention is shown in FIGS. 22-38.

Figure 22:
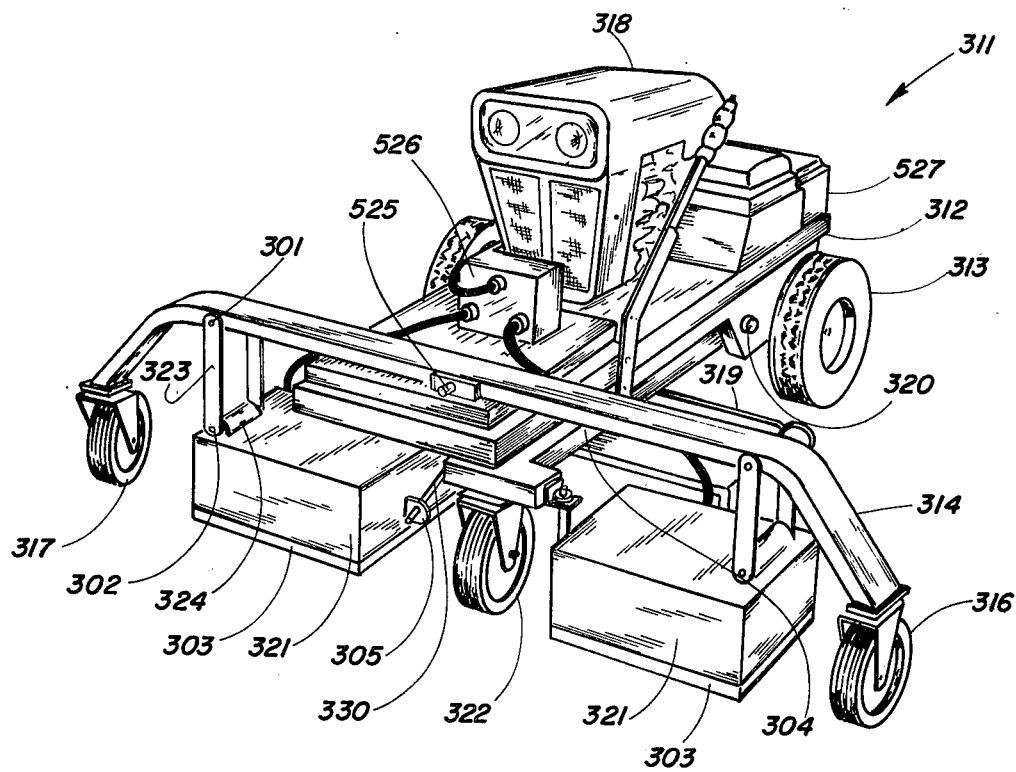
FIG. 22 is a prospective view of another embodiment of an automatic lawn mower according to the present invention.

Referring in particular to FIG. 22, there is shown an automatic lawn mower apparatus 311 according to the present invention. Mower 311 includes an upper frame 312 which is supported at three positions consisting of the two rear wheels such as 313 and the pivot point 525 on the front axle 314. Two double swivel action castor wheels 316 and 317, such as that shown in U.S. Pat. No. 2,478,035 to Babcock, are mounted to the front axle. The frame supports the engine in housing 318 and all power train components. It also supports the mower unit 319. A lower frame 304 is supported at three positions consisting of two pivot points 320 located in like position on opposite sides of upper frame 312 and from center double swivel action castor wheel 322.

Upper frame 312 and lower frame 304 are attached directly at only the two pivot points 320. Consequently, the upper frame 312 and lower frame 304 form two platforms which are maintained in alignment in the direction of travel but have vertical freedom of movement at their forward support to permit the forward three wheels to float independently with the ground contour.

Two sensor assembly structures 321 are each attached in like manner. Two support members 323 are each attached to the axle 314 by pin 301 and hinged in a plane axial to pin 301. The other ends of the two outboard support members 323 are each attached to bearing mount 324 of its respective sensor assembly structure 321 by pin 302 and in similar manner permitted to hinge in an axial plane to pin 302. Pins 301 and 302 are parallel to one another and to the ground, providing up-to-down and forward-to-rear restriction of motion but permitting lateral motion of sensor assembly structure 321.

Figure 37A:
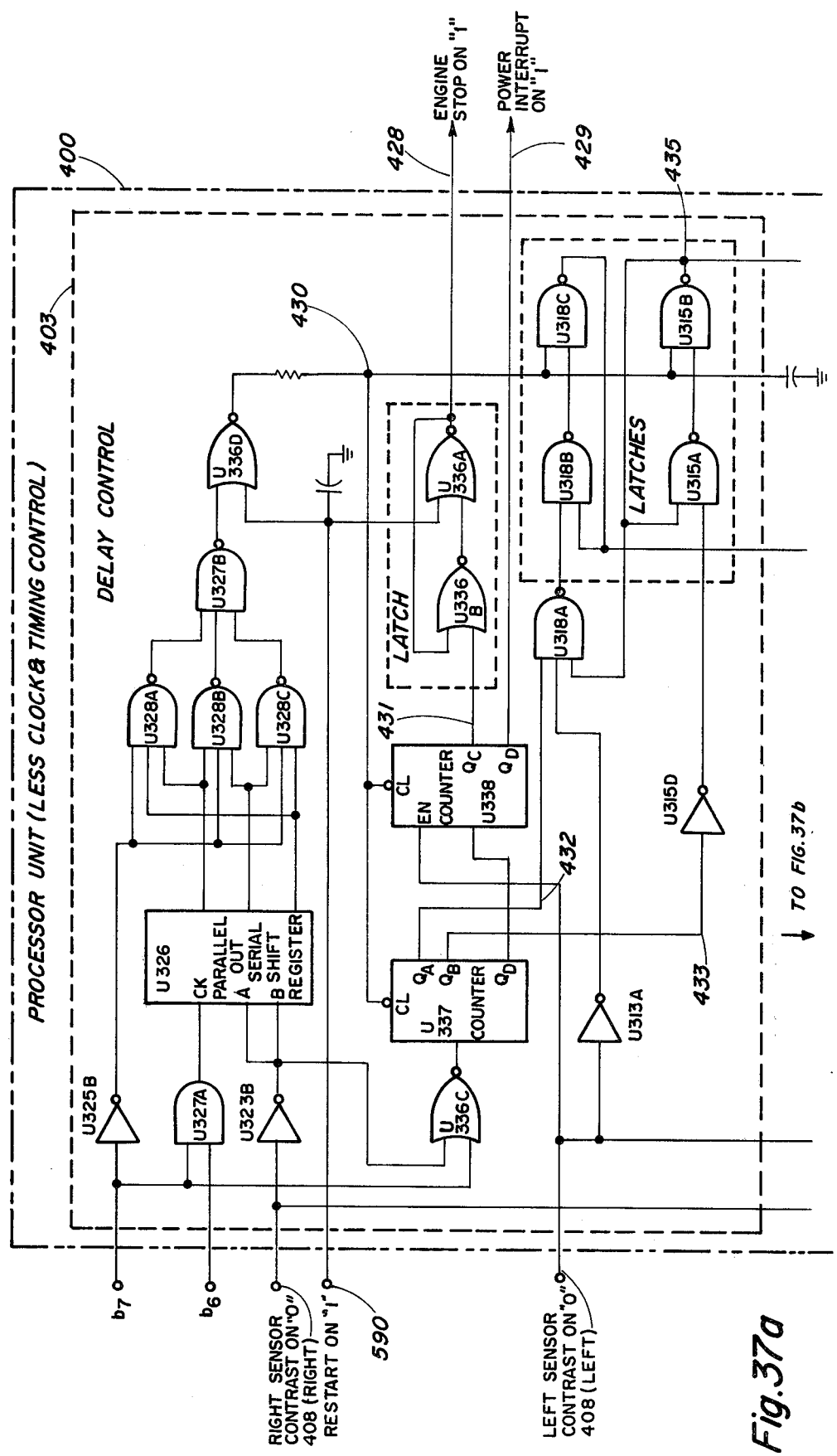
FIGS. 37a and 37b comprise an overall schematic representation of a processor unit.
Figure 37B:
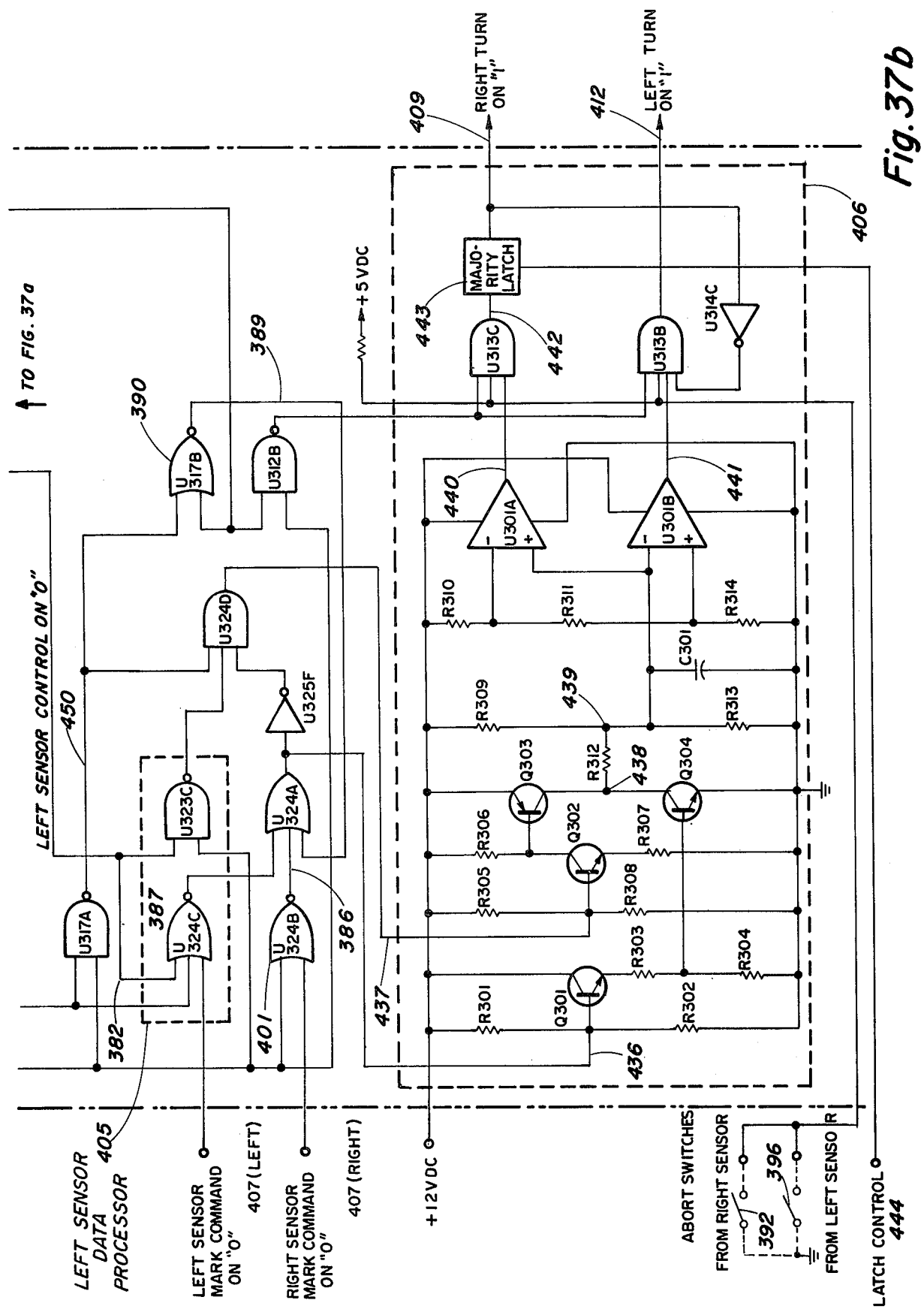

A respective center support member 330 provides support at pivot point 315 to restrict motion of sensor assembly 321 in all three planes of movement while permitting rotation at pivot point 315. Consequently, each sensor assembly 321 is permitted to float essentially parallel to the ground at a height on each end determined almost totally by the adjacent wheel. An abort switch is located in the middle of the span of each sensor assembly 321 for detection of ground height conditions too near or too far from the bottom of the sensor assembly 321. The purpose of this switch is to disable turn commands when the ground contour is excessively irregular and could result in guidance command errors. The electrical implemenation of this switch is shown in FIG. 37.

Figure 23:
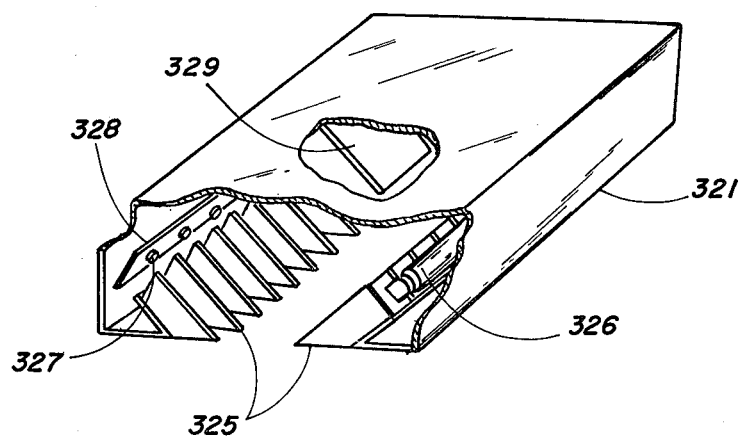
FIG. 23 is an enlarged view of the top portion of a sensor assembly of the mower of FIG. 22 with a portion removed.

Referring now to FIG. 23, the top portion only of sensor assembly 321 is shown with a portion of the end removed, showing compartments having open ends formed by light dividers 325 and the sensor assembly 321 structure. A florescent light source 326, coupled from the souce of electrical power rearwardly on the mower apparatus, emits light which exits through the compartments beneath light source 326 and out of the bottom of sensor 321. By means to be explained herein, some of this emitted light is reflected back into the compartments formed at the left side of sensor assembly 321 as shown in FIG. 23. The light reaches photoconductor detectors 327. Sensor circuit board 328 contains a plurality of detectors 327 at fixed intervals and locates each into an individual compartment. Since the sensor assembly 321 shades the area beneath it, light souce 326 is the predominant source. Light shades 303 are shown in FIG. 22 and are constructed of a flexible material. They enclose the bottom perimeter of the sensor assembly 321 to shield much of the sunlight from underneath the structure.

Figure 24:
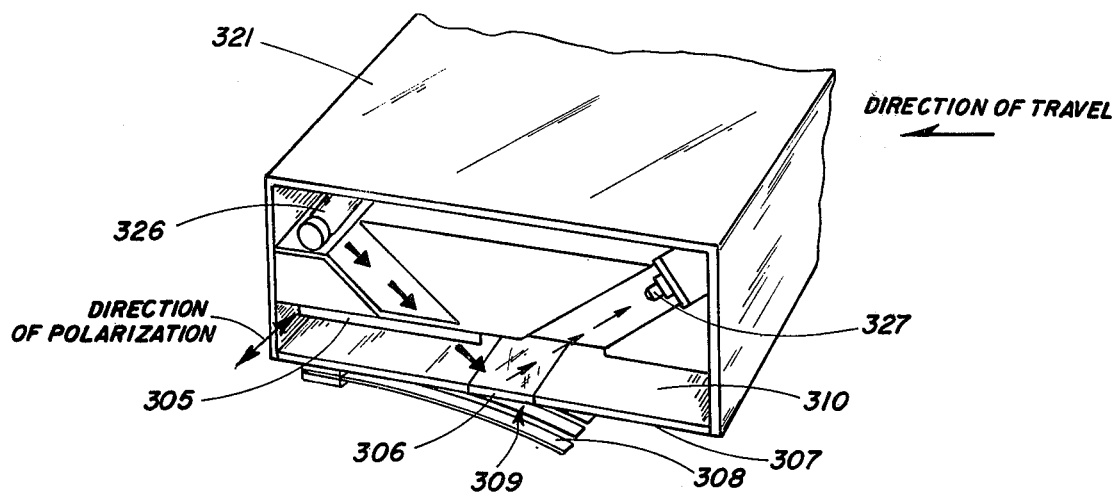
FIG. 24 is an enlarged view of a sensor assembly of the mower of FIG. 22 with the end removed to detail the bottom portion.
Figure 25:
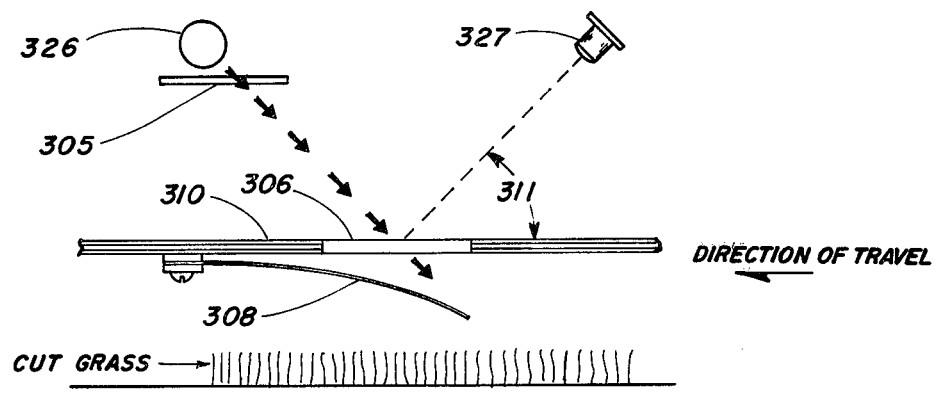
FIG. 25 is a diagrammatic representation of a photoconductor in the sensor assembly in FIG. 24 in a short grass configuration.
Figure 26:
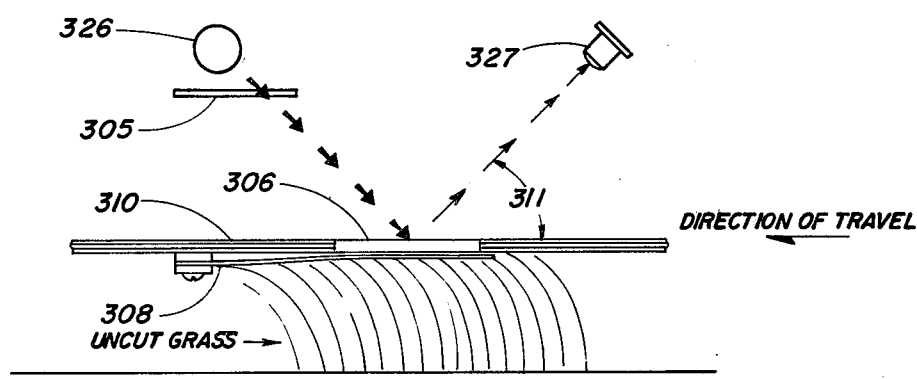
FIG. 26 is a diagrammatic representation of the operation of a photoconductor in the sensor assembly of FIG. 24 in a long grass configuration.

The lower portion of the sensor assembly is shown coupled with the top portion in FIG. 24. All walls of the compartments shown in FIG. 23 are nonreflective surfaces. The light exiting and entering the compartments of the sensor assembly is channeled into a single direction. The compartment depth and width, defined by the spacing of adjacent light dividers 325 and their width respectively, is less than the length of the compartment in the direction of light travel. Therefore, the light is channeled into a single direction in both planes. This condition is hereinafter referred to as columnized light. Assuming that FIGS. 25 and 26 represent sensor assembly 321 cross-sections of two adjacent compartments, the grass transition line would be between the compartments. The resolution between the two adjacent detector responses to the amount of light received would depend largely upon the extent to which the light is columnized when being emitted and when reaching the detector. Also shown in FIG. 23 are circuit boards 329.

FIG. 24 shows a cross-sectional view of the sensor assembly 321. The light source 326 is directed through a channel, through a light polarizer 305 and through the window 306 of the sensor assembly 321. The incidence angle of the light striking the window 306 is designed to be the Brewster angle for the window material. The structure prevents light from being reflected from either the top of bottom surfaces of the window 306. Light passing through the polarized sheet is polarized in the direction shown in FIG. 24.

This polarized light then strikes the surface of the window at the Brewster angle. This again causes the light to be polarized but at an angle 90° from the polarization of the light polarizer 305. This double polarizing at right angles using the Brewster angle theoretically prevents any light from being reflected due to the window 306 surfaces in a manner known to those familiar with laser technology. The window now provides a means of sealing the photodetectors 327 and light source 326 from a dirty environment and provides a surface to stop the light switch actuators 308 at the ideal reflection angle to align the reflective surface 309 to direct light from the light source 326 to a detector 327. With a spring light switch actuator 308 in the undeflected position, light passes through the window 306 and is not reflected back to a detector 327. Consequently, an array of light switches are formed which relate the deflected condition of individual spring light switch actuators 308 across the array.

The light switch actuators are constructed of metalized mylar or similar material capable of being deflected with small applied force, capable of providing a highly reflective surface 309, and capable of exhibiting properties of toughness and resistance to deformation. The sensor bottom 307 is constructed with an irregular surface to reduce adhesion to the light switch actuators when the mower is exposed to high moisture conditions. The switches function at low force levels. Similar switching could conceivably be done with mechanical switches actuated similar to that described for the light switch; however, the reliability would probably be less due to the low force levels available for actuation.

The positions of the light switch actuators 308 while passing over cut and uncut vegatation are shown in FIGS. 25 and 26. FIG. 25 shows the position over cut vegation where light switch actuator 308 is not deflected from its normal position. Light from the light source 326 is directed through the window 306 and is not reflected back toward the detector 327. FIG. 26 shows the position over uncut vegetation. The vegetation deflects the light actuator 308 to the rear and rotates the reflective surface of the actuator up against the bottom of window 306. This surface then reflects light passing through the window 306 and directs it back through the window 306 and toward the detector 327.

FIG. 27 shows a sector of a lawn to be mowed and defines the mowing pattern utilized to enable self-tracking of the automatic lawn mower according to the present embodiment. An outside boundary 331 is mowed with a different device. A border 332 is also mowed around all obstacles such as 333. A fixed installation causing recognizable height contrast could be substituted for mowed boundaries. Note the margin of uncut grass 334 around the obstacle and within the triangularly shaped border 332.

The normal mode of operation for lawn mower 311 is to travel in a counterclockwise direction, as shown in FIG. 27, with the interface, or transition line, between cut and uncut grass centered beneath the right sensor assembly. The right sensor has priority over the left sensor but only one provides guidance control at any given time. The automatic lawn mower is pre-positioned to begin at the point indicated at 336. The right sensor of the automatic lawn mower tracks on the initial cut-uncut grass transition line 337 until the sensor assembly of the present embodiment overhangs into the cut grass at the corner 338. When the transition line is not detected electronically by the right sensor and after appropriate delays, to be explained hereinafter, the left sensor is interrogated to determine if it has acquired tracking data. When it has been determined that neither sensor has detected a transition line, the lawn mower goes into a pre-programmed left turn, with response to the left sensor being disabled until a later condition, causing the sensors to rotate and cross the transition line 337.

The left sensor crosses the transition line first but its response is ignored by the guidance control. When the right sensor recognizes transition line 337, the right sensor regains guidance control, the programmed left turn is discontinued and the left sensor is again enabled although the priority right sensor maintains control. This sequence is repeated until the final lap provided no obstacles are within the mowing boundary.

FIG. 27 shows an obstacle 333 within the mowing boundary and the maneuvering pattern for bypassing this obstacle. Consider the lap around the outside boundary which permits the cut path developed by the lawn mower to overlap with the point of the cut grass border 332. On the following lap, the right sensor suddenly stops recognizing the transition line 37 because all of the grass ahead of the lawn mower is cut at the point of the triangular border 332. The left sensor is then interrogated and is found to recognize a transition line where both cut grass of border 332 and uncut grass of margin 334 lie under the left sensor. The left sensor then assumes guidance control and bypasses margin 334 as shown in FIG. 27. As the bypass mode progresses, the right sensor again recognizes the transition line of the outer boundary, guidance control is regained by the priority right sensor and the normal mode of tracking around the outer perimeter of an unmowed area is resumed. The bypass mode is repeated each lap until the outer boundary cut path merges with the inside cut side of the triangular shaped border 332. Following laps then do not recognize the obstacle and the normal mode of tracking is continued until the final lap. As the lawn mower cuts the remaining uncut grass on its final lap and reaches the end of the uncut grass, it goes into the pre-programmed left turn described previously for corner conditions. The lawn mower continues to circle in a counterclockwise direction for a timed period. At the end of the timed period, the lawn mower engine is turned off automatically. A short time later, the electrical power to the electronics is shut off.

Referring now to FIG. 28, the relative locations of the sensor assemblies 380 and 381, mower unit 384 and pivot point 385, for executing the turns, are shown to illustrate the positions at initiation of a right-angle left turn. FIG. 29 illustrates the same elements, as shown in FIG. 28, at the completion of a right-angle left turn. Pivot point 385 in FIGS. 28 and 29 is the same point with the sensor assemblies 380 and 381 and mower unit 384 remaining in the same relative position because of the mounting configuration of the main structure as shown in FIG. 22. It can be seen from the final position of FIG. 29 that the mower unit 384 is in position to mow after the right angle turn without leaving uncut grass during the turn. The pivot point offset 501 is essential to obtain right-angle turn capability.

Pivoting about the offset position is accomplished by employing two independently driven hydraulic motors; one to power each of the rear wheels. When turning left at right-angles, the right wheel is driven forward and the left wheel is driven in reverse. Various ratios of drive speeds can be employed to shift the pivot point offset 501. Equal right or left turn capabilities could be realized if the pivot point offset 501 coincided with the center line of the mower unit 384. The electrical control provided is analog, with greater steering errors producing larger magnitude correction commands. The direction and speed of the rear wheel on the inside of a turning maneuver is dependant upon the magnitude of the control signal directing the turn.

Figure 30:
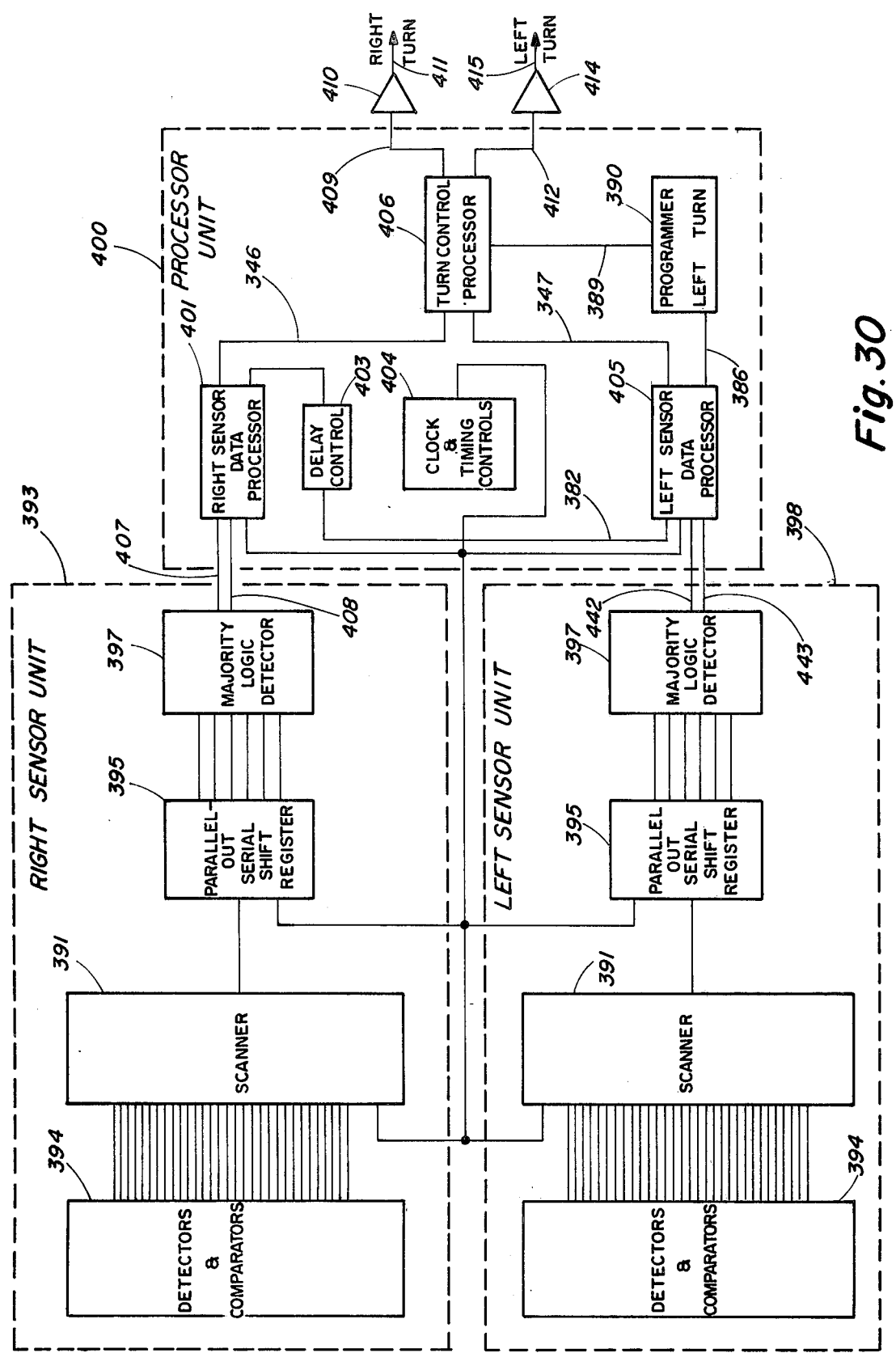
FIG. 30 is a block diagram of the electrical portion of the mower of FIG. 22 showing the development of steering commands.
Figure 35A:
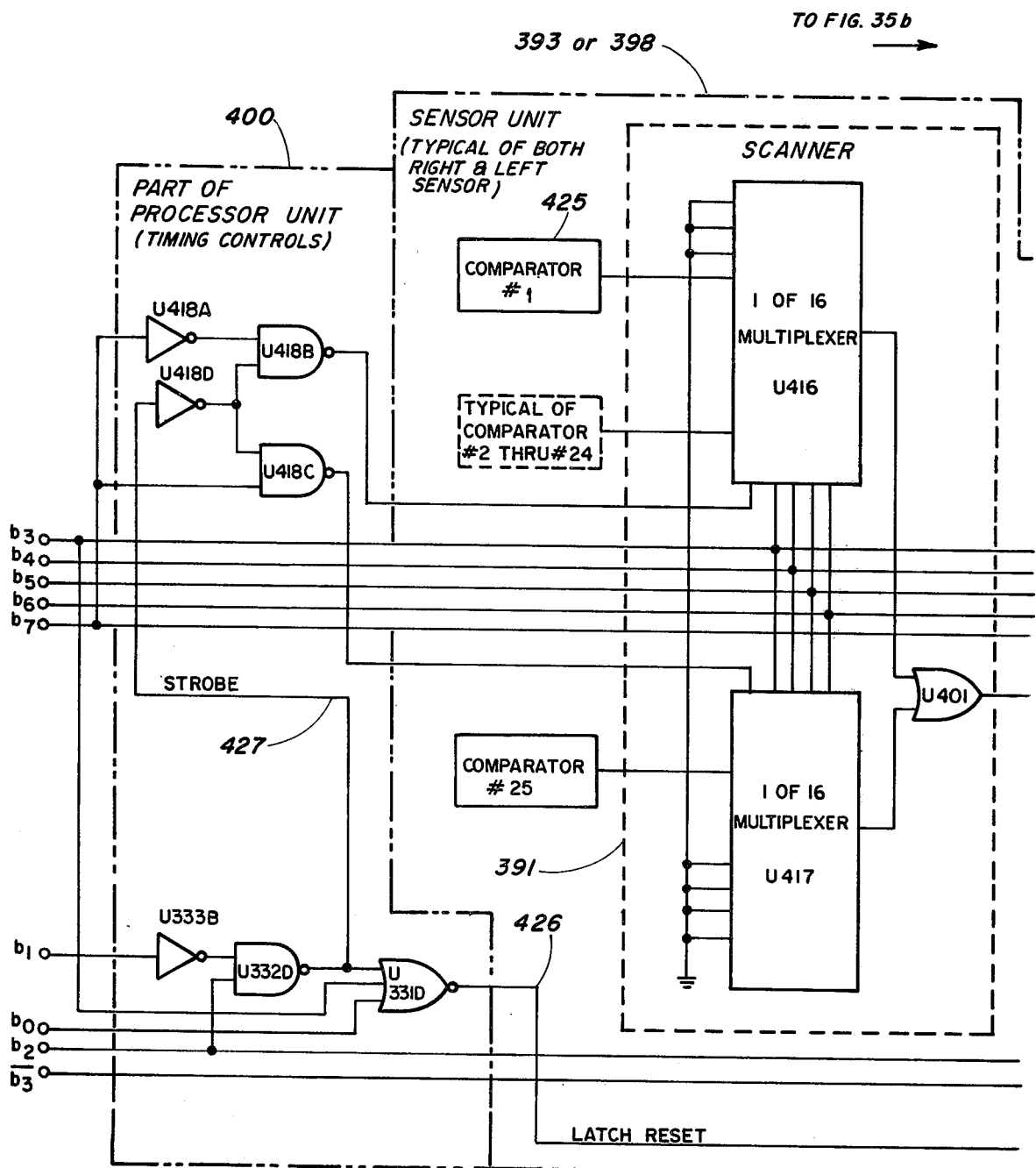

Referring now to the block diagram of FIG. 30, the electrical controls of the system are illustrated. The system consists of three major blocks: a processor unit 400 and two identical sensor units, a right sensor unit 393 and a left sensor unit 398. Operator control switches interface with the processor unit 400 to provide on/off, manual/automatic mode and manual turn controls. The detectors and comparators 394 are shown in greater detail hereinafter in FIGS. 32 and 33. FIG. 35 defines the contents of a sensor unit, right sensor unit 393 and left sensor 398. FIG. 37 defines the content of the processor unit 400.

the physical orientation of the detector elements and the structure of the circuitry to translate grass height conditions, within the detection area of the two sensor units, into meanful electrical data further explains the mechanical to electrical interface of the lawn mower device. The right sensor unit 393 of FIG. 30 is the same interiorly as left sensor 398, and therefore only the right sensor assembly 393 shall be discussed in detail herein. The detectors and comparators 394 optically sense the displacement of the light switch actuators 308 as a function of grass height, convert the result to an electrical indication of this status, compare predetermined points, and provide output signals representative of these comparisons. In a preferred embodiment of the present lawn mower, sensor unit 393 includes 32 photoresistors mounted in a line perpendicular to the direction of travel of the lawn mower in equally spaced positions as shown in FIG. 31.

Figure 33:
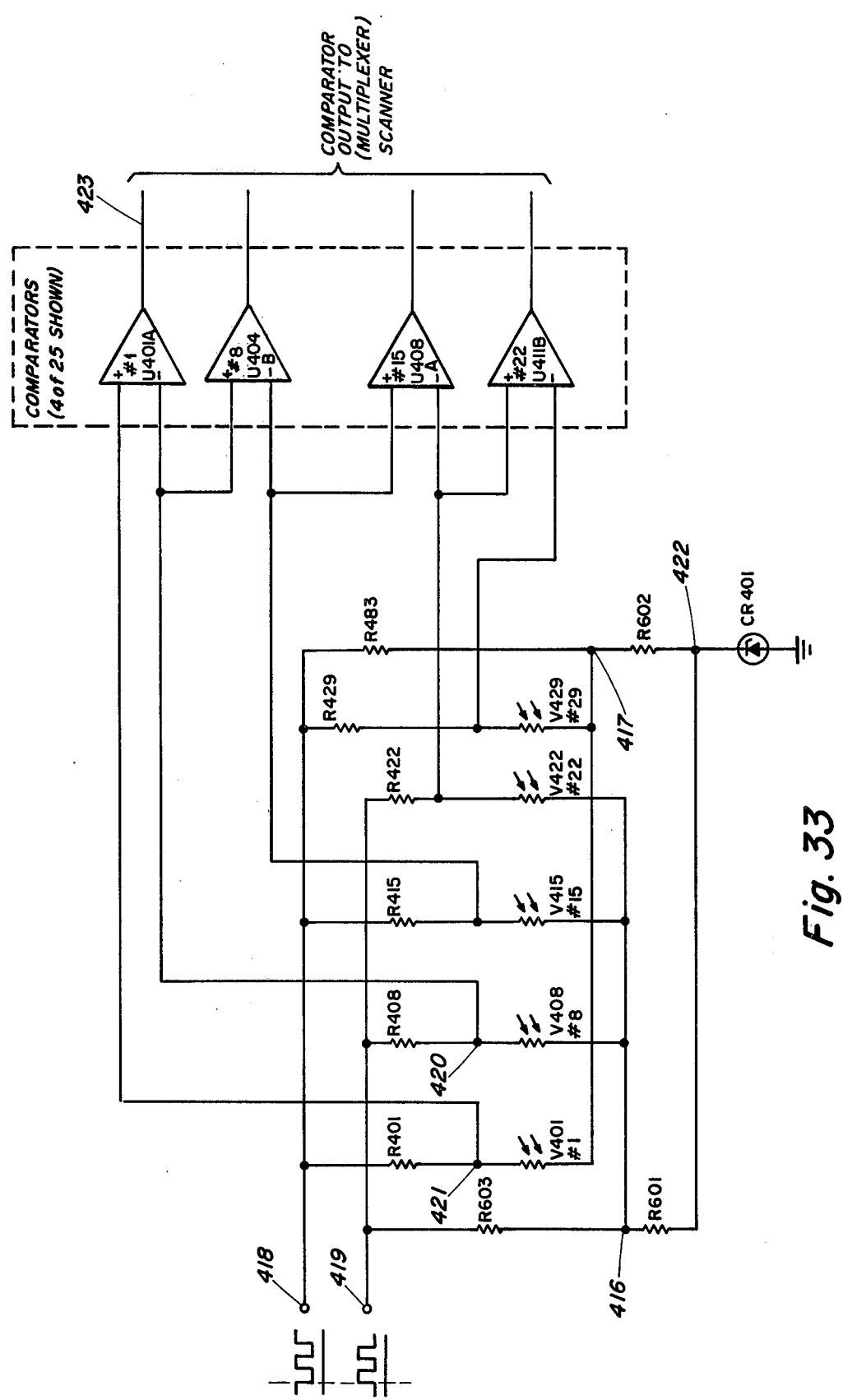
FIG. 33 is a schematic representation of the detector pairing pattern for comparators of the sensor circuitry.

Twenty-five comparisons are made simultaneously, with each comparator input being the output signal of a pair of photoconductors separated by seven spaces. The twenty-five comparators each have one of photoconductors numbered one through twenty-five as one of the pair of photoconductors of the comparator. The second of the pair is numerically seven integers larger. Consequently, many photoconductors are connected into two comparators. FIG. 33 shows a representative interconnect pattern of the photoconductors into the comparators.

The output of each comparator, signal 423, is representative of the grass height difference of the area being monitored by the two photoconductors wired to the comparator. The possible states of the comparator output signal 423 are a static logic "1", a cyclic signal as shown in FIG. 34 for the comparator output 423 and a static logic "0". These states represent higher grass on the right, equal height (either cut or uncut) grass, and higher grass on the left, respectively. In FIG. 33, the purpose of the two out of phase cyclic input signals superimposed on a DC voltage, signals 418 and 419, and the resulting cyclic comparator output 423, when the grass height is determined to be equal, will be explained hereinafter.

Figure 31:
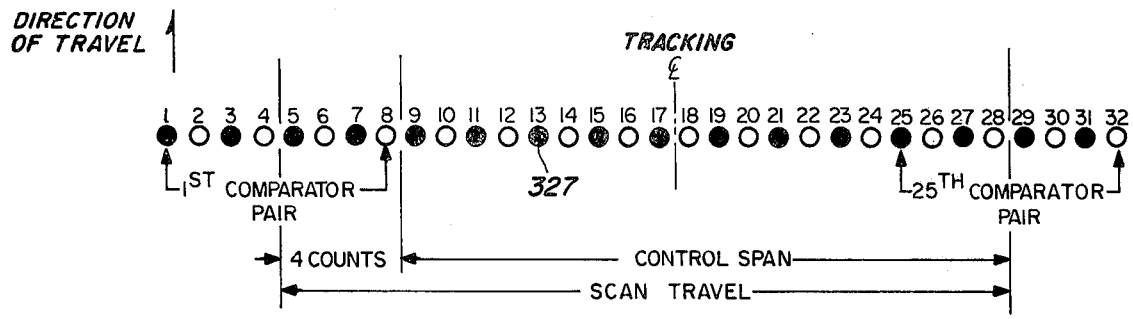
FIG. 31 is a diagrammatic illustration of the location of photoconductor elements within the sensor assembly.

FIG. 31 shows shaded and un-shaded photoconductor positions representative of photoconductors connected to current sources proportional to signals 418 and 419. FIG. 33 shows how these current sources are developed from their respective voltage sources through a series resistor to a photoconductor. The twenty-five comparator outputs 423 from the detectors and comparators (block 394 of FIG. 30) and seven wired logic 0 conditions are then connected to a scanner 391 consisting of two one-of-sixteen multiplexers as shown in FIG. 35. The scanner 391 sequentially samples the outputs of the twenty-five comparators to provide data representative of grass height samples from right to left of center of the sensor unit in the direction of its travel. The scanning is done repetitively and the timing (phase) of a transition in grass height detection within a single scan relates the electrical response to the physical location of the transition line between cut and un-cut grass.

Figure 32:
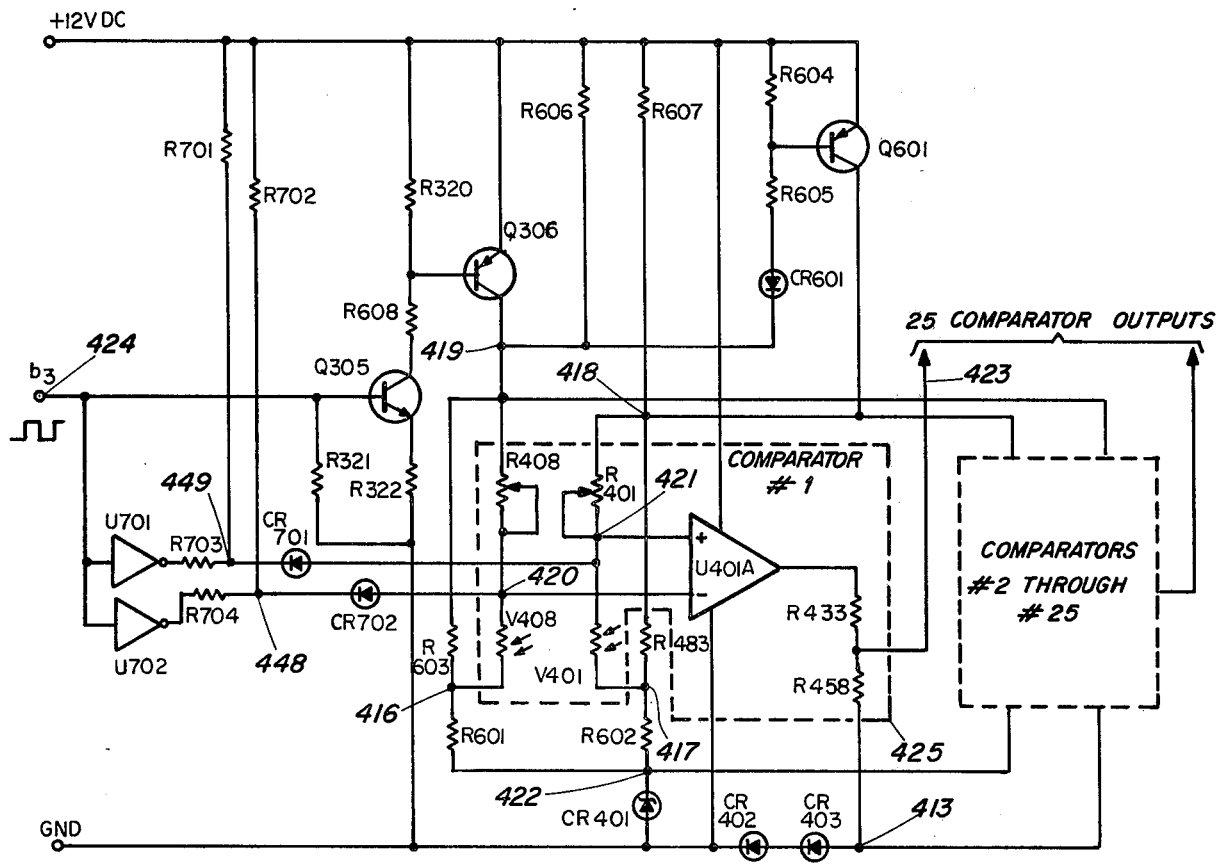
FIG. 32 is a schematic representation of the sensor light detector and comparator circuitry.

Referring now in more detail to FIG. 32, the comparator measurement circuitry is shown for one comparator which is representative of each of the twenty-five comparators contained for either detector and comparator block 394. The waveform of points indicated as 419 and 424 (FIG. 32) are shown in FIG. 34. The generation of the waveform at point 419 from the input at 424 is developed by Q305, Q306, R608, R321, R322, R606, R603, R601 and CR 401. The generation of a signal out of phase with signal 419 but with a like DC component is accomplished by CR 601, R 605, R604, Q601, R483, R602 and CR401. Zener diode CR 401 provides a bias voltage to point 422 to prevent clipping of the input signals to the comparator U401A. Adjustable resistors R401 and R408 substantially exceed the resistance of photoconductors V401 and V408.

Therefore, current flow through photoconductors V401 and V408 is not appreciably changed by photoconductor resistance changes with light levels. The adjustable resistors are adjusted to provide the waveform at points 420 and 421 as shown in FIG. 34 when equal light is applied to photoconductors V401 and V408. A voltage divider comprising R603 and R601 and a voltage divider comprising R483 and R602 are each of like resistance values. The voltage dividers cause a small portion of the signals at 419 and 418 to be superimposed on the DC voltage at point 422 developing the signals 416 and 417 respectively. When a light switch actuator 308 is deflected, causing a higher level of light to reach the photoconductor, the photoconductor resistance is substantially reduced (high conduction state) and the voltage developed across it is much smaller than it was in the non-deflected actuator position. The superimposed signal component at points 416 and 417 is designed to be greater than the voltage developed across the photoconductor so that minor variations in the high conduction state of the photoconductor do not cause false indications. The superimposed signal component becomes insignificant when the photoconductor is in its low conduction state. The comparator output will then be as shown in FIG. 32 at point 423 (FIG. 34).

With the photoconductors in the low conduction state, signal 421 is clamped to signal 449 by conducting diode CR 701 during negative-going half cycles of signal 421. In like manner, signal 420 is clamped to signal 448 by diode CR 702 during its negative going half cycles. This enlarges the peak-to-peak voltage of both signals 420 and 421 and prevents even large variations from causing false indications. As the photoconductors go significantly into the intermediate conduction state, these diodes become back biased and no longer affect the signal levels at signal 420 or 421. The proportion of peak-to-peak voltage to DC voltage is then under control of signals 418 and 419. This results in improved control of the light intensity where switching occurs. Because of this control, the threshold level can be set nearer to the high condition level requiring a lesser resistance change to switch from an "ON" to an "OFF" indication of the switches detected by the comparator circuit. This decreases the response time of the control circuitry.

If the light intensity applied to photoconductor V408, caused by light switch actuator 308 deflection, significantly exceeds that on V401, the resistance of photoconductor V401 will exceed that of photoconductor V408 and the voltage at point 421 will always exceed that at point 420. The comparator U401A output will be a continuous DC voltage (logic 1) in this condition. Conversely, if the difference in applied light intensity is reversed, the comparator output U101A is 0 volts (logic 0). Contrast will be detected in both of these instances. However, if the difference in applied light intensity is not large, point 420 may be shifted up or down with respect to point 421 (as shown clearly in FIG. 34), but the two signals still will cross every half cycle.

This represent a condition where contrast is not recognized and explains how noise inputs are suppressed.

The polarity of U401A is as shown in the drawing in FIG. 33 if the photoconductor on the left is further to the left physically in the system than the one shown on the right. If the photoconductor positions are reversed in the system (and some are), the polarity of U401A is reversed. In the waveforms of FIG. 34 and in the description herein, the terms b0, b1, b2, through b7 apply to binary bits from a chain of counters driven by a clock, and bit b0 is the lowest order bit. System timing for scanning and other sampling functions is provided by the clock and timing controls 404 of FIG. 30. The functions of the clock and counters used for timing are accomplished by means which are common in practice and shall not be explained in detail herein.

Referring now to FIG. 35, cross reference may be made to the corresponding four blocks of FIG. 30 of right sensor unit 393. The timing controls of the processor unit 400 develop a strobe signal 427 which is used to develop U418B and U418C outputs as strobe inputs to U416 and U417 mutliplexers respectively of scanner 391. The output of scanner 391 is signal 399 shown on FIG. 36. This represents a sampling from right to left of thirty-two inputs, including seven wired logic 0 conditions. Due to the seven-interval spacing of photoconductors of a comparator and the sequencing pattern, seven consecutive pulses develop during normal scanning where a grass height transition is within the monitored areas. The output signal 399 of FIG. 35 is applied to flip flop U501A to develop a noise suppressed signal 402 of the same pulse count as signal 399.

Figure 36:
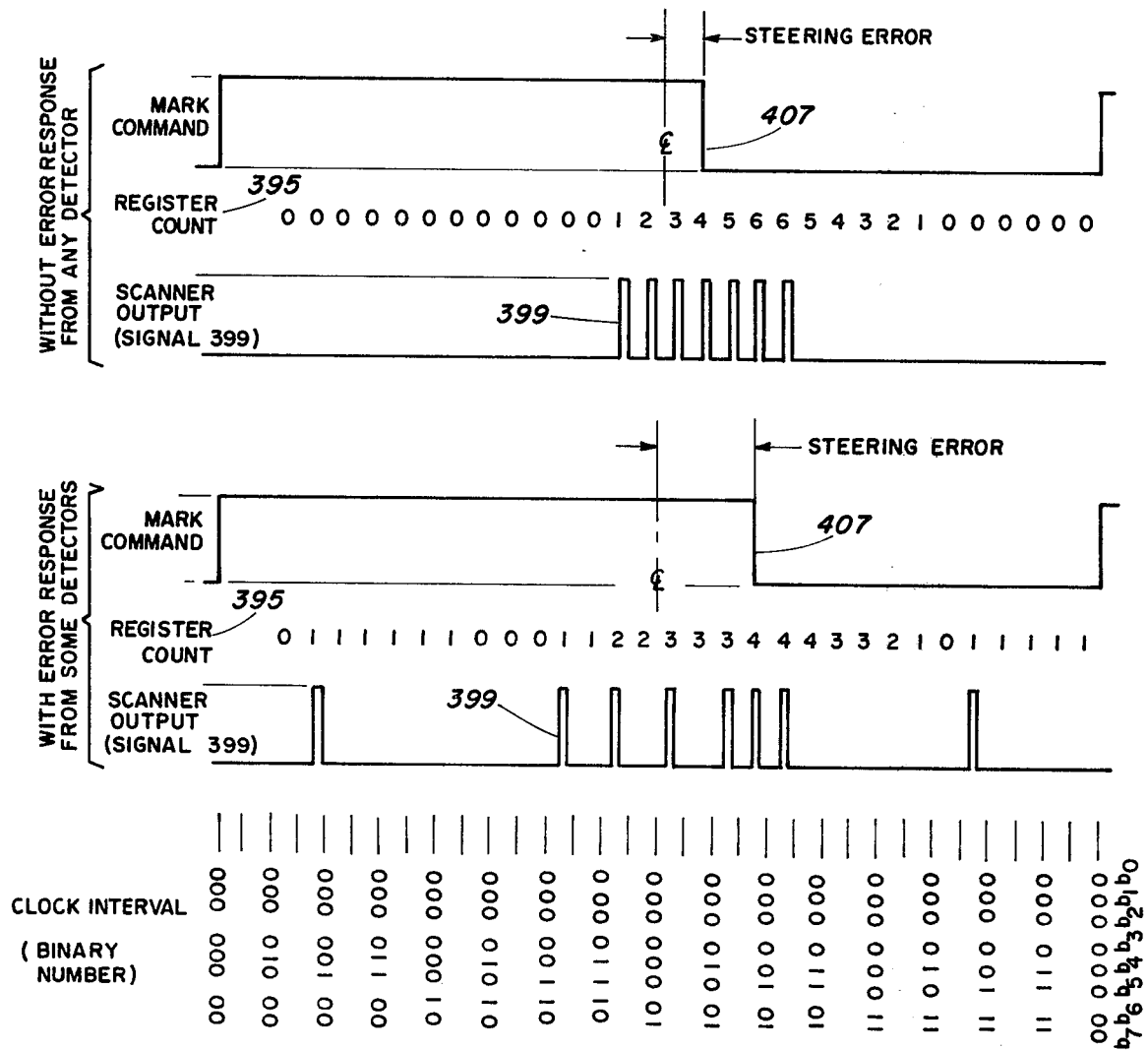
FIG. 36 illustrates waveforms generated within a sensor unit.

This signal is applied to a serial-in, parallel-out shift register U502 which developes a stored register count 395 (as shown in FIG. 36). The register is clocked each incremental count of FIG. 36. Majority logic detector 397 examines the content of the last six intervals for pulses originating at the scanner 391 output. It provides a logic 1 output only if at least four of the six register outputs are logic 1 (recognizing a pulse). The purpose of this circuit is to greatly improve the statistical probability of recognizing a true transition line and ignoring a false indication even when error output conditions exist from some of the detectors. FIG. 36 shows the waveforms resulting from two sets of condition, one with no detector errors within a scan and the other with multiple detector errors within a scan.

The mark command 407 changes state when the transition line has been detected and the deviation from the midway point in the scan represents the steering error. The mark command signal 407 is developed at the output of flip flop U501B. The output is cleared to a logic 1 at the beginning of each scan by U507A. U507A applies a present to U501B only when a logic 1 exists at the output of the majority logic detector 397 which occurs when four pulses have been stored in any of the 6 register outputs of the shift register U502 (register count 395).

If the sensor unit detects a transition line, a sensor contrast on 0 signal 408, is developed from the output of latch U505A and U505B. The sensor unit 393 outputs are updated each scan.

Referring now to FIG. 30 and considering only the processor unit 400, the processing of data from right unit 393 and left sensor unit 398 is illustrated. The clock and timing controls 404 have been previously described with the explanation for the sensor units and will not be considered in detail herein. The two basic output signals, mark command and contrast on 0 signals, from both the right and left sensor units are directed to their respective data processing block, right sensor data processor 401 and left sensor data processor 405.

As has been previously mentioned, the right sensor unit 393 outputs have priority. If the right sensor contrast on 0 signal 408 is a logic 0, the right sensor data processor 401 outputs data, essentially by gating the right sensor mark command 407 through block 401, to the turn control processor 406. Left sensor data processor 405 inhibits control data to turn control. Processor 406 when the right sensor data processor 401 is in control. When the right sensor contrast on 0 signal 408 goes to a logic 1 signifying loss of tracking data, right sensor data processor 401 releases control of turn control porcessor 406 to the left sensor data processor 405 after the delay control 403 introduces delays and verification of conditions. The left sensor data processor 405 assumes control of turn control processor 406 if tracking data is available from left sensor unit 398.

If tracking data is not available, control of turn control processor 406 is assumed by programmed left turn 390. The turn control processor 406 develops the right turn control signal 409, left turn signal 412 or provides no output signals when only a small tracking error exist in response to the control input provided. Drivers 410 and 414 then amplify the control signals 409 and 412 respectively for steering control. Cross references by block number and signal number can be made between many of the like points of FIGS. 30 and 37.

Referring now to FIG. 37, the processor unit 400 circuitry is shown. The basic function of this unit is to select the mark command from one of two sensor units and convert this signal into turn commands. The turn control processor 406 is the circuit that converts the mark command. This circuit provides the fundamental operations of integrating an input mark command signal, applying that signal to a dual threshold comparator, and developing right and left steering commands. To better understand the operation, the design structure of the circuit of the turn control processor 406 will first be described.

Resistors R309 and R313 are of equal value and higher resistance than resistor R312 and cause signal 439 to stabilize at mid-voltage (a positive 6 volts) when neither transistor Q303 or Q304 is conducting. Resistor R312 and capacitor C301 form an integrator. Signal 438 is integrated to develop signal 439. Resistors R310 and R314 are of equal resistance and of higher resistance value than R311 to become a part of a comparator when coupled with U301A and U301B. This comparator has a high and low level threshold established by resistors R310, R311 and R314 as it monitors the signal 439. If signal 439 exceeds the high level threshold, signal 440 will be a high level. If signal 439 drops below the low level threshold, signal 441 will be a high level. If signal 439 falls between the threshold levels, both signals 440 and 441 will be low level signals.

Signal 439 is normally an AC triangular waveform superimposed upon a DC (average) voltage level. The spread of the high and low level thresholds of the comparator are greater than the peak-to-peak magnitude of signal 439 so that when the DC (average) voltage level of this signal is at mid-voltage the entire signal is within the threshold boundaries. Thus, both signals 440 and 441 are at low levels. As the DC (average) voltage level of the signal 439 is increased, the peak of the waveform begins to exceed the high level threshold of the comparator and a high level output is developed at signal 440 for a small duty cycle of the triangular waveform cycle rate. As the DC (average) voltage level continues to increase, the duty cycle of signal 440 continues to increase to the point where it is a continuous high level when the entire waveform of signal 439 exceeds the high level threshold.

Signal 441 is developed in a similar manner when the DC (average) voltage level of signal 439 is decreased.

FIG. 36 shows a typical mark command. If the lawn mower is ideally tracking, the mark command would be a high level half of the time and a low level half of the time. This timing causes transistors Q303 and Q304 to alternately switch into the conduction state half of the time. Therefore, the DC (average) voltage level of signal 439 would be mid-voltage and no turn commands would develop. If the conduction time intervals of transistors Q303 and Q304 are significantly different, a turn command of duty cycle proportional to the timing unbalance is developed.

NAND gates U313B and U313C, when otherwise enabled, provide processor unit 400 output steering commands. The input signals controlling the timing to turn control processor 406 are signals 437 and 436. Signal 437 is the same as the mark command of the controlling sensor unit and signal 436 is the inverted form of signal 437. When signal 436 is a high level and signal 437 is a low level, transistors Q 301 and Q 304 are in the conduction state and transistors Q 302 and Q303 are in the non-conduction state. As the input signals are reversed, the transistor conduction states are likewise reversed. Programmed left turn 390 (FIG. 30) provides signal 389 from NOR gate U317B. The signal causes a continuous high level at signal 436 from U324A and a continuous low level at signal 437 and causes signal 439 to approach ground, develops a high level at signal 441, and results in a left turn command.

There are several considerations for steering control after the right sensor data processor 401 (NOR gate U324B) does not recognize tracking data. First, the left sensor unit 398 may acquire tracking data before or immediately after the right sensor unit 393 loses tracking data. In this event the left sensor data processor 405 must assume steering control. Second, if the left sensor unit 398 does not have tracking data, the left sensor data processor 405 must be disabled from tracking until the right sensor data processor 401 has again acquired tracking control. This is necessary to complete a normal left turn since the left sensor unit 398 would cross the cut-uncut grass transition line first. However, an improper tracking condition would exist if the left sensor data processor 405 assumed steering control. Third, the timed shut down circuit begins counting if neither sensor unit has tracking data. The counting time is several scans of the right sensor unit 393. To prevent an error tracking response from resetting the shut down timers to initial count each time an error occurs, two out of three consecutive scans must concur that valid tracking data exists. This substantially reduces the probability of erroneous response.

Each of these considerations is accounted for by the delay control 403 circuitry. FIG. 37 illustrates this circuitry. Counters U337 and U338 provide the timing for each of the three timing considerations. The counters are enabled to count whenever signal 408 (right) goes to a logic 1, signifying a loss of tracking data from right sensor unit 393. However, the counters remain cleared as long as signal 430 is a logic 0. This is the case when a majority of two or more of the last three consecutive scans indicate sensor tracking data exists from the right sensor unit 393 and applied at signal 408 (right) through inverter U323B to shift register U326 input. The shift register stores the status of three consecutive scans, NAND gates U328A, U328B, U328C and U327B determine if a majority condition exists, and NOR gate U336D derives the clear signal 430 to the counters. If a majority does not exist, the counters are permitted to continue counting without reset. When counter U337 output signal 432 goes to a logic 1 for the first time, NAND gate U318A monitors for tracking data from the left sensor unit 398 at signal 408 (left), through inverter U313A. Signal 435 is initially a logic 1 and enables NAND gate U318A to provide a logic 0 output if tracking data is sensed from the left sensor unit 398.

If this occurs, a latch, consisting of NAND gates U318B and U318C stores a logic 0 at signal 383 and enables the left sensor data processor 405 to assume control of turn control processor 406. When signal 433 from counter U337 first becomes a logic 1, a latch, consisting of NAND gates U315A and U315B stores a logic 0 at signal 435, which disables the latch, consisting of U318B and U318C, from further sampling of left sensor tracking status. However, if signal 382 was previously latched to a logic 0, it remains unchanged and the left sensor data processor 405 retains steering control. During the interval where tracking data from the right sensor unit was lost and the time that signal 435 remained a logic 1 before latching to a logic 0, NAND gate U312B provided a logic 0 output which disables NAND gates U313B and U313C from providing steering commands, signals 409 and 412.

Majority latch 443 provides a latching function for the right turn command 409 under conditions where contrast is not detected by either sensor unit and the right sensor has uncut grass within its path. This can occur at a corner condition where the mower has been executing a left turn and the right sensor overshoots the transition line. This can occur if the turning response time is not fast enough to prevent the right sensor from going all the way into uncut grass. Without the latch, the processor unit would erroneously command a left turn. With the latch active, the right turn command continues until the right sensor again detects contrast before unlatching.

If neither sensor unit provides tracking data, NOR gate U317B (programmed left turn 390) develops a logic 1 at signal 389 after signal 435 goes to a logic 0. Signal 389 is applied to OR gate U324A input to develop a left turn command from turn control processor 406. Shut down commands, signals 428 and 429, are developed after tracking data has been lost and the terminal counts have been reached.

Figure 38:
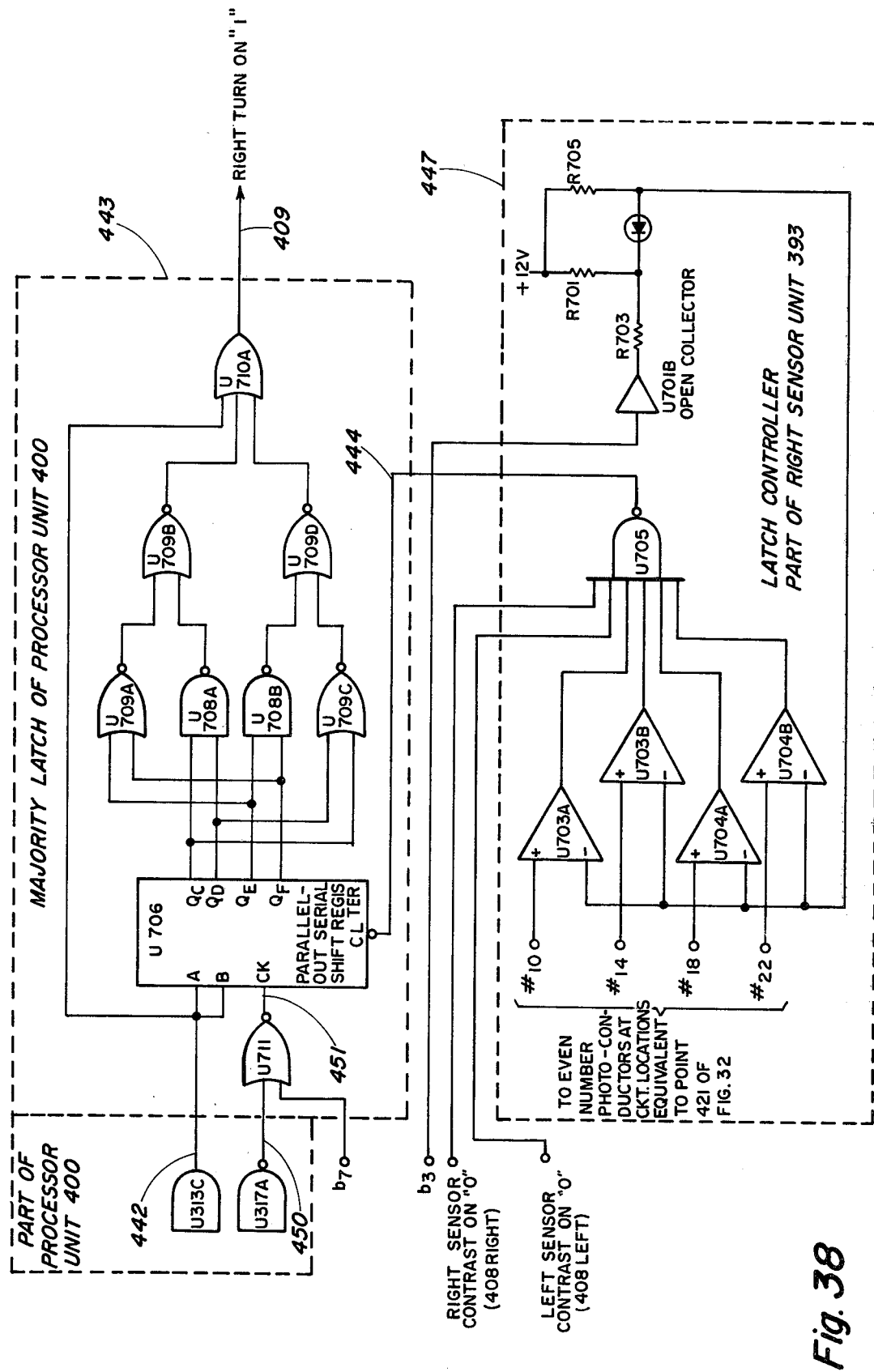
FIG. 38 is a schematic diagram of the majority latch shown in FIG. 37 and the controlling circuitry.

The majority latch 443 is further shown in FIG. 38. Clock signal 451 to shift register U706 is pulsing at the b7 rate as long as either sensor recognizes contrast as controlled by signal 450 from NAND gate U317A. If AND gate U313C provides a logic 1 output at signal 442, a right turn condition exists and signal 409 output of OR gate U710A goes to a logic 1. At the same time, signal 442 input is being shifted into shift register U706. Once sufficient logic 1 conditions are stored in the shift register outputs so that at least 3 of the 4 outputs shown are a logic 1, majority latch 443 develops one or two additional logic 1 inputs to OR gate U710A.

If the situation occurs where signal 442 indicates a right turn command by a logic 1 and then neither sensor recognizes contrast, signal 442 would go to a logic 0 as shown in FIG. 37.

Since other inputs to OR gate U710A are a logic 1 by the stored condition of the shift register, the right turn on a logic 1 signal 409 is latched to a logic 1. With neither sensor recognizing contrast, the clock signal 451 is disabled and the stored conditions of shift register U706 are maintained. The last 2 input conditions at the b7 rate, of signal 442 are unpredictable due to the termination sequence of the mark command signal. Consequently, only the third through sixth previous signals stored are used by the majority latch. The clear input 444 to the shift register U706 is used to disable the latch under conditions where the right sensor has cut grass within its path. This is required to unlatch the control when the shift register U706 has stored right turn data prior to reaching a corner condition. Latch controller 447 generates a pulsed logic 0 when all of the 4 photoconductor input conditions exceed a threshold level simultaneously (indicating cut grass conditions) and contrast is not detected at either sensor. Latch controller 447 is located in the right sensor unit 393.

While there have been described above the principles of this invention in connection with specific apparatus, it is to be clearly understood that this description is made only by way of example and not as a limitation in the scope of the invention. Although the discussion herein does not include fail-safe features and self-diagnostic features, their omission is for the purpose of simplifying the illustration of the principles of the invention. Such additions to the apparatus shown herein are obvious to those familiar in the art. It is apparent that many variations of the principles disclosed herein, for example changing direction from counterclockwise, scanning from right to left, counting intervals, comparator spacings, etc., are possible. Also, the control apparatus may be utilized for other similar operations such as harvesting.

In addition, the sun could be directed through the light channels in order to replace the internal source. Since sunlight would vary in intensity, a photoconductor could be substituted for resistor 401 to photoconductor V401 and each series resistor to its respective photoconductor. These added photoconductors would sense the sunlight intensity at each of the light input channels.

What is claimed is:

1. Guidance apparatus for a self-propelled mower comprising:
   first sensor means, including several photosensitive receptors and light source means for directing light towards said receptors, for producing output signals associated with each said receptor dependent upon the light received by each said receptor;
   first comparator means for comparing predetermined combinations of said output signals and for producing comparator output signals dependent upon said comparisons; and
   control means for producing guidance signals for a self-propelled mowing apparatus in response to the content of said comparator output signals, said photosensitive receptors being in an array whose principal dimension is essentially transverse to the normal direction of travel of the mower, the path of light from said light source means to said receptors being such that the presence of a substance to be mowed in the vicinity of one of said receptors affects the amount of light received by said receptor, said control means and said first comparator means including means responsive to said several receptors for detecting a boundary between mowed and unmowed vegetation.

2. The apparatus of claim 1 in which the light source of the sensor means comprises a plurality of columnized light compartments and each photosensitive receptor is in a corresponding compartment.

3. The apparatus of claim 2 in which the photosensitive receptors are photosensitive resistors.

4. The apparatus of claim 1 in which the sensor means includes a first sensor assembly and a second sensor assembly, each said assembly comprising a plurality of photosensitive receptors and light source means for directing light toward said receptors.

5. The apparatus of claim 4 in which the control means includes logic circuit means for producing guidance signals for the mowing apparatus in response to comparator output signals associated with the first sensor assembly of the sensor means and for establishing a priority over comparator output signals from outputs associated with the second sensor assembly.

6. The apparatus of claim 5 in which the control means further includes means for responding to signals associated with the first sensor assembly when said signals indicate a transition between mowed and unmowed substance between the receptors and light source means of the first sensor assembly, and for otherwise responding to the signals associated with the second sensor assembly.

7. The apparatus of claim 1 in which the comparator means includes means for sequentially comparing predetermined pairs of sensor means outputs.

8. The apparatus of claim 1 in which said control means includes means for producing signals representing the position beneath and array of the existence of and the location of the boundary between the mowed and unmowed areas.

9. The apparatus of claim 8 in which said transverse array includes more than ten photosensitive receptors.

10. The apparatus of claim 8 in which the sensor means includes a first sensor assembly and a second sensor assembly, each said assembly comprising a plurality of photosensitive receptors and light source means for directing light toward said receptors.

11. The apparatus of claim 1 in which said light source means and said receptors are contained in a dust protective enclosure having a non-glare window allowing light to traverse out of and reflect back through the window to said receptors.

12. The apparatus of claim 11 in which said light source means is operable to emit light through a first light polarizer, said light being directed at said non-glare window at the Brewster angle for the window material resulting in attenuation of the reflected portion of said light by orthogonally polarizing it from the direction of said first light polarizer, said window transmitting the remaining portion of said light.

13. The apparatus of claim 11 in which the extent of light reflected back through said window to said receptors is determined by several light reflective elements, said elements positioned to be deflected to an extent dependent upon the height of vegetation in the vicinity of said elements, deflection of said elements resulting in a change of light reflected back through the window.

14. The apparatus of claim 1 in which said photosensitive receptors are in a linear array, there being at least six photosensitive receptors in the array and in which said comparator means compares receptors spaced apart from one another by at least two spaces.

15. The apparatus of claim 1 which further comprises:
second sensor means, including several second photosensitive receptors and second light source means for directing light toward said second receptors, for producing second output signals associated with each of said second receptors; and
second comparator means including means for producing second comparisons of predetermined combinations of said second output signals and for producing second comparator output signals dependent upon said second comparisons, and in which said control means includes means for giving
(1) first priority to said first sensor means and first comparator means when a mowed-unmowed substance interface is detected by said first sensor means and first comparator means,
(2) second priority to the second sensor means and second somparator means when a mowed-unmowed substance interface is detected by said second sensor means and second comparator means, and
(3) third priority to a preprogrammed control routine.

16. The apparatus of claim 1 in which said comparator means includes means for producing output signals which are indicative of the presence of a mowed-unmowed substance interface between two of said receptors spaced apart from one another and in which said control means also includes means for producing guidance signals based upon a plurality of said interface comparator output signal indications from a preselected number of said comparator output signals.

17. The apparatus of claim 1 which includes means for making the comparator means unresponsive to a false indication from an error output condition of one of said receptors.

18. Guidance apparatus for a self-propelled mower comprising:
first sensor means for detecting a differential of vegetation height of a first boundary of a mowing area;
second sensor means for detecting a differential of vegetation height at a second boundary of a mowing area; and
control means for producing guidance signals for a self-propelled mower suitable for use in tracking either said first or second boundary in response to detection of a differential of vegetation height by said second sensor means when said first sensor means does not detect a boundary but said second sensor means does detect a boundary and by said first sensor means when said first sensor means does detect a boundary.

19. The apparatus of claim 18 wherein said first sensor means and said second sensor means include several photosensitive receptors and light source means for directing light toward said receptors for producing output signals associated with each said receptor dependent upon light received by each said receptor.

20. Guidance apparatus for a self-propelled mower comprising:
first sensor means positioned to the side of the mower in its normal direction of travel nearest the outer boundary of a mowing area;
second sensor means positioned to the side of the mower in its normal direction of travel farthest from the outer boundary of a mowing area;
multiple detector means within each of said first and second sensor means, said detector means including detectors positioned to monitor an assigned area of vegetation within its path, said detectors positioned in an array whose principal sensing dimension is essentially transverse to the normal direction of travel of the mower, each of said detectors including means for producing a detector output signal dependant upon the vegetation height within its path;

comparator means for producing comparisons of predetermined combinations of said detector output signals and for producing comparator output signals dependent upon said comparisons, said comparator means coupled to said first and second sensor means;

processing means for converting comparator output signals to control signals, said processing means coupled to said first and second sensor means, said processing means including means for providing a status indication signal of the presence of a vegetation height differential within the monitored areas of the detectors within an array, said processing means also including means for providing a location indication signal dependent upon the location of transition of vegetation heights within the monitored areas of said detectors; and control means for producing guidance signals for a self-propelled mower from the status indication signal and the location indication signal of said processing means.

21. The apparatus of claim 22 wherein:

said processing means includes means for producing a status indication signal and a location indication signal for each of said first sensor means and said second sensor means; and said control means includes means for giving priority of control to the status indication signal and the location indication signal of the first sensor means over the like signals of the second sensor means.

22. Guidance apparatus for a self-propelled vehicle comprising:

sensor means including a plurality of switches in an array whose principal dimension is essentially transverse to the normal direction of travel of the vehicle, said sensor means operable to produce output signals associated with each switch dependent upon the closed or open status of said switch;

a plurality of actuator means each for controlling the closed or open status of one of said plurality of switches dependent upon the height of vegetation within its path;

comparator means operable to produce comparisons of predetermined combinations of said output signals and for producing comparator output signals dependant upon said comparisons; and control means operable to produce guidance signals for a self-propelled vehicle in response to the content of said comparator output signals.

23. The apparatus of claim 22 in which said comparator means includes a scanner for sequentially sampling output signals of said comparator means.

24. The apparatus of claim 22 wherein said comparator means includes means for making the comparator means unresponsive to a false indication from an error output condition of one of said detectors.

25. The apparatus of claim 22 wherein said plurality of switches are of a light sensing type and said plurality of actuator means are movable and have a reflective surface positionable to control light reaching said switches.

26. The apparatus of claim 22 in which the sensor means includes a first sensor assembly and a second sensor assembly, each assembly comprising a plurality of switches in an array whose principal dimension is essentially transverse to the normal direction of travel of the vehicle, said comparator means includes a first comparator means for processing output signals from said first sensor assembly and a second comparator means for processing output signals from said second sensor assembly, each of said first and second comparator means producing output signals.

27. The apparatus of claim 26 in which said control means includes means for establishing priority for said first comparator means over said second comparator means.

28. Guidance apparatus for a self-propelled mower comprising:

sensor means, including several detectors positioned in an array whose principal sensing dimension is essentially transverse to the normal direction of travel of the mower, each of said detectors positioned to monitor an assigned area of vegetation within its path, each of said detectors producing a detector output signal dependent upon the vegetation height within its path;

comparator means operable to produce comparisons of predetermined combinations of said detector output signals and for producing comparator output signals dependent upon said comparisons;

processing means for converting comparator output signals to control signals, said processing means providing a status indication signal of the presence of a vegetation height differential within the monitored areas of the detectors within the array, said processing means also providing a location indication signal dependent upon the location of transition of vegetation heights within the monitored areas of the detectors;

control means for producing guidance signals for a self-propelled mower from the status indication signal and the location indication signal of the processing means.

29. The apparatus of claim 28 in which said comparator means includes a scanner for sequentially sampling output signals of said comparator means.

30. The apparatus of claim 28 wherein said comparator means includes means for making the comparator means unresponsive to a false indication from an error output condition of one of said detectors.

* * * * *